United States Patent [19]
Sakanaka et al.

[11] Patent Number: 5,680,241
[45] Date of Patent: Oct. 21, 1997

[54] OPTICAL SPACE COMMUNICATION

[75] Inventors: Tetsuo Sakanaka, Sagamihara; Kanjo Orino, Tokyo, both of Japan

[73] Assignee: Canon Kabushiki Kaisha, Tokyo, Japan

[21] Appl. No.: 614,263

[22] Filed: Mar. 12, 1996

Related U.S. Application Data

[63] Continuation of Ser. No. 174,007, Dec. 28, 1993, abandoned.

[30] Foreign Application Priority Data

| Dec. 30, 1992 | [JP] | Japan | 4-359837 |
| Dec. 30, 1992 | [JP] | Japan | 4-359838 |
| Dec. 30, 1992 | [JP] | Japan | 4-359839 |
| Dec. 10, 1993 | [JP] | Japan | 5-341257 |
| Dec. 10, 1993 | [JP] | Japan | 5-341258 |
| Dec. 10, 1993 | [JP] | Japan | 5-341259 |

[51] Int. Cl.$^6$ ............................................. H04B 10/00
[52] U.S. Cl. .................... 359/172; 359/154; 356/432
[58] Field of Search .......................... 359/154, 161, 359/172; 372/40, 41; 356/432

[56] References Cited

U.S. PATENT DOCUMENTS

| 4,233,567 | 11/1980 | Chernoch | 331/94.5 P |
| 4,355,893 | 10/1982 | Chicklis | 372/40 |
| 4,946,239 | 8/1990 | Garmon | 350/96.31 |
| 5,109,362 | 4/1992 | Berni | 356/349 |
| 5,363,463 | 11/1994 | Kleinerman | 356/432 |

OTHER PUBLICATIONS

Wyatt, "Spectroscopy of Rare Earth Doped Fibres", SPIE vol. 1171, Fiber Laser Sources and Amplifiers, pp. 54–64.

*Primary Examiner*—Leo Boudreau
*Assistant Examiner*—Bhavesh Mehta
*Attorney, Agent, or Firm*—Fitzpatrick, Cella, Harper & Scinto

[57] ABSTRACT

An optical space communication method is for communication with a laser as a radiative source and with a light signal therefrom propagating in the atmosphere. In the method, the communication is performed under the following conditions. In case a transmission distance of optical space communication is between 100 m inclusive and 200 m, the laser is a laser with an oscillation wavelength L (nm) in a wavelength range of between 967 nm inclusive and 1110 nm or in a wavelength range of between 1165 nm inclusive and 1315 nm, whereas in case the transmission distance is not less than 200 m, the laser is a laser with an oscillation wavelength L (nm) in a wavelength range of between 986 nm inclusive and 1090 nm or in a wavelength range of between 1225 nm inclusive and 1295 nm. At any position in a transmission path between a transmitter exit and a receiver entrance, an irradiance is set to at most $6.47 \cdot 10^{(L-700)/500}$ (W/m$^2$) where the oscillation wavelength L (nm) of the laser is in a wavelength range of 950 nm to 1050 nm while to at most 32.3 (W/m$^2$) where the oscillation wavelength L is in a wavelength range of 1050 nm to 1400 nm.

21 Claims, 16 Drawing Sheets

SCATTERING OF LIGHT WAVE IN ATMOSPHERE

CARBONIC ACID GAS ABSORPTION

WATER-VAPOR ABSORPTION

TRANSMITTANCE OF ATOMOSPHERE

SPECTRAL DISTRIBUTION OF SOLAR IRRADIANCE G$_\lambda$
(BY MOON, 1940)

a: SOLAR RADIATION OUTSIDE ATMOSPHERE
b: ABSORPTION BY OZONE
c: AFTER RAYLEIGH SCATTERING
d: AFTER SCATTERING AND ABSORPTION BY AEROSOL
e: AFTER ABSORPTION BY WATER-VAPOR AND OXYGEN

TEMPERATURE DEPENDENCY OF
OSCILLATION WAVELENGTH 5,680,241

1

OPTICAL SPACE COMMUNICATION

This application is a continuation of application Ser. No. 08/174,007, filed Dec. 28, 1993, now abandoned.

BACKGROUND OF THE INVENTION

1. Field of the Invention

The present invention relates to an optical space communication apparatus and methods for communication between remote places by propagating a modulated light signal in the atmosphere.

2. Related Background Art

Optical space communication is communication between remote places several hundred meters to several kilometers distant from each other by making a light signal propagate in a free space. A system therefor is constructed, for example, as shown in FIG. 1. A light emitting device 1 in a transmitter emits a light beam and then the light beam is collimated by a collimating optical system 2 into a collimated beam L1. The beam propagates in the atmosphere and enters a collecting optical system 3 in a receiver. After being condensed by the collecting optical system 3, the beam is received by a photodetector 4. The light signal received by the photodetector 4 is converted into an electric signal, which is output therefrom.

A preferable radiation source is a semiconductor laser, which is a high-power point source and which can supply a light beam capable of being readily changed into a collimated beam with less divergence and capable of being directly modulated at high speed by an electric signal.

When utilized in the atmosphere over the ground, this method is affected by scattering and absorption to attenuate the intensity of light. There are a variety of atmospheric scatterings classified in the Rayleigh scattering by air molecules, the Mie scattering by fine particles (aerosol) such as dust, fog, haze, etc. having the same size as the wavelengths of light, and the geometro-optic scattering by large particles such as raindrops and snow.

Since the geometro-optic scattering has no dependency on the wavelength, it does not have to be taken into consideration upon determining an operating wavelength. The degree of the Rayleigh scattering changes in proportion to a fourth power of wavelength and is relatively large in the visible light region. In contrast, the Rayleigh scattering is not predominant in the infrared region above the wavelength of about 1 μm.

The degree of the Mie scattering is determined depending upon a size distribution of particles such as aerosol and complex to be theoretically analyzed, but decreases as the wavelength becomes longer as shown in FIG. 2. FIG. 2 is a graph to show scattering characteristics of the Mie scattering. Each curve in FIG. 2 is obtained by a calculation under an assumption that only particles having a single particle size exist. Although there are particles with various sizes distributed in actuality maintained is the tendency that the scattering decreases as the wavelength becomes longer.

This means that, considering the attenuation due to the scattering, the infrared region with wavelengths of above near 1.0 μm is more advantageous for optical space communication apparatus rather than the near infrared region close to the visible light, because the attenuation decreases as the wavelength becomes longer.

It is conventionally known that in absorption by molecules constituting the atmosphere, there are absorption bands by water vapor and carbon dioxide in a broad range in the infrared region, as shown in FIG. 3 to FIG. 6. FIG. 3 is a graph of a absorption spectrum by molecules in the air and FIG. 4 is a graph of an absorption spectrum by carbon dioxide. FIG. 5 is a graph of an absorption spectrum by water vapor, and FIG. 6 a graph to show a transmittance of the air. It is known that there are absorption spectra in the near infrared region with wavelengths of below 1.0 μm, as shown in graphs of spectral distribution of solar radiation in FIG. 7, FIG. 8 and FIG. 9.

This data in the near infrared region, however, includes the influence of solar radiation and the upper atmosphere over the earth, which contains atmospheric components different from those in a space near the surface of the earth where the optical space communication is actually performed. Therefore, the space near the surface may not necessarily have the same spectral distribution as those in FIG. 7, FIG. 8 and FIG. 9. Further, since the data in FIGS. 7 to 9 are the absorption spectra after the light passed through the atmosphere of 100 km, the data cannot be used directly to judge how the influence appears in propagation of several hundred meters to several kilometers near the surface.

In addition, FIG. 7, FIG. 8 and FIG. 9 show absorption bands with a certain width, but specify no accurate wavelengths. Further, values for wavelength are different between FIG. 7, FIG. 8 and FIG. 9. Therefore, it must be empirically checked how much the wavelength of employed semiconductor laser is affected by the absorption.

For these reasons, it is necessary for designing of optical space communication apparatus to take the influence of atmospheric absorption into consideration, and obtain accurate absorption wavelengths and absorption data through actual measurement in light propagation over the ground in addition to the solar spectrum. Here, the measurement of solar spectrum has such an advantage that a change due to absorption appears large, because the propagation distance is long in the atmosphere. In contrast, a change due to absorption is small in measurement over the ground, because the propagation distance cannot be set so long. Thus, the measurement over the ground is likely to miss a small absorption spectrum, but has an advantage of obtaining an amount of attenuation in actual transmission.

FIG. 10 is a graph obtained by Inventors in detailed measurement of a spectral distribution of sun light after having passed through the atmosphere, and FIG. 11 is a graph to show a spectral distribution after white light travels about 50 m over the ground. Also, FIG. 12 is a schematic diagram to show a measurement system used in the measurement of these spectral distributions. As another test, after a semiconductor laser beam propagates in the atmosphere, an amount of attenuation due to absorption was measured using a light power meter. Comparing the data, it was found that each graduation (scale unit) in FIG. 11 corresponded to an attenuation amount of about 15 dB for 50 m.

Above described were the factors to cause attenuation of a signal, such as absorption and scattering. In addition to these, background light noise is another factor to affect the optical space communication. The background light noise is caused by extraneous light from the outside, other than the original signal light which is the semiconductor laser oscillation beam. When the extraneous light enters the photodetector, a direct-current component of photovoltaic current increases shot noise, thereby lowering the S/N ratio of signal. Since the optical space communication apparatus is set mostly outdoors, most of extraneous light is from the sun. As seen from FIG. 7, FIG. 8 and FIG. 9, the spectral components in solar radiation become smaller as the wavelength becomes longer. Therefore, the background light noise can be made smaller on the long wavelength side than on the short wavelength side.

According to the measurement by Inventors, the atmospheric absorption band is a set of narrow spectra each with an absorption-spectral width being usually below 0.1 nm. Here, the oscillation wavelength of semiconductor laser changes stepwise depending upon its operating temperature, as shown in the graph in FIG. 13 to show the temperature characteristics of an oscillation wavelength of semiconductor laser. It is rare in ordinary use that the oscillation wavelength of semiconductor laser is coincident with an atmospheric absorption spectrum. However, with a change in operating temperature of semiconductor laser, the oscillation wavelength of semiconductor laser might be coincident with an atmospheric absorption spectrum, as shown by A in FIG. 14, which is an enlarged drawing of FIG. 13. In that occasion, since the width of oscillation wavelength of semiconductor laser is normally narrower than the width of atmospheric absorption spectrum, temporary attenuation may occur because of the absorption.

A high-power semiconductor laser in the near infrared region normally oscillates in the single longitudinal mode and has a very narrow spectral width of below 0.01 nm. Also, the oscillating wavelength of semiconductor laser changes depending upon the temperature of device or the forward current. FIG. 13 shows a typical example of temperature characteristics of oscillation wavelength of semiconductor laser, in which the wavelength of semiconductor laser changes about 10 nm for a temperature change of from 0° to 50° C. and in which the change is stepwise because of the so-called mode hopping.

FIG. 14 is an enlarged drawing of the temperature characteristic diagram, which shows locations of some absorption spectra as well. Since the oscillation wavelength of semiconductor laser changes stepwise, a probability that the wavelength is made coincident with any one of absorption spectra is relatively low. However, since a flat portion between steps has a slight slope in the wavelength characteristics of semiconductor laser, an operating point may be made coincident with the wavelength at A by chance. In that state, the oscillation spectrum of semiconductor laser is superimposed on the wavelength band of the atmospheric absorption spectrum. This results in attenuating the entire oscillation spectrum, because the width of the oscillation spectrum of semiconductor laser is narrower than the width of the atmospheric absorption. This means that some of apparatus may have an oscillation beam of semiconductor laser free of influence of absorption in the normal operating condition but could change the oscillation wavelength with a change in operating temperature of semiconductor laser due to a change in operating environment, causing a phenomenon of temporary attenuation of signals upon passing the point shown by A in FIG. 14. The attenuation due to absorption increases in proportion to a transmission distance when expressed in a unit of dB. Therefore, the influence of attenuation becomes more enhanced as the transmission distance becomes longer.

It can be said accordingly that the conventional optical space communication apparatus was designed without fully considering the absorption due to the atmosphere and should lack the reliability in case the propagation distance is long in the atmosphere.

Another issue of the conventional optical space communication apparatus is the safety of an emission beam from semiconductor laser against human eye. A semiconductor laser is a high-luminance point source and has high coherence. This is advantageous in use for communication but could be dangerous because when a beam is incident into a human eye, it is focused in a small spot on the retina.

It is technically possible to decrease the influence of absorption by increasing a permissible amount for attenuation in use of high-power semiconductor laser as means for solving the problem of attenuation of signal light due to the atmospheric absorption as described above. Use of an excessively high-power semiconductor laser should be avoided considering the danger to human eye. As for the influence to human eye, a point to be considered is not the overall radiation power of semiconductor laser emission beam but a power per unit cross section (hereinafter referred to as irradiance (radiant flux density)). If the overall radiation power is fixed, the irradiance can be made smaller by increasing the emission beam size, that is, by increasing the diameter of collimating lens. There is, however, a practical limit in respect of cost, volume, weight, etc.

Some of conventional optical space communication apparatus employed a small size of emission beam with irradiance at a level dangerous to eye, requiring use of safety goggles in handling. Such optical space communication apparatus cause no trouble as long as special persons experimentally use the apparatus at a special place. However, the apparatus must be made always safe in order to be widely and generally used as practical apparatus. To realize it, there are three requirements to be simultaneously satisfied, i.e., to keep the output of light signal at a level safe to eye, to be free of the influence of light attenuation due to the absorption by the atmosphere and to enable long distance communication.

SUMMARY OF THE INVENTION

It is, therefore, an object of the present invention to provide an optical space communication apparatus which can keep the output of light signal at a level safe to the eye, which is free of the influence of absorption spectra by the atmosphere, and which enables long distance communication.

An optical space communication apparatus according to the present invention, achieving the above objects, is an optical space communication apparatus using a laser as a radiative element and performing communication by making a light signal propagate in the atmosphere, wherein, under the environment in the entire operating temperature range of the optical space communication apparatus, in case a transmission distance of said optical space communication apparatus is between 100 m inclusive and 200 m, said laser is a laser with an oscillation wavelength L (nm) in a wavelength range of between 967 nm inclusive and 1110 nm or in a wavelength range of between 1165 nm inclusive and 1315 nm, whereas in case said transmission distance is not less than 200 m, said laser is a laser with an oscillation wavelength L (nm) in a wavelength range of between 986 nm inclusive and 1090 nm or in a wavelength range of between 1225 nm inclusive and 1295 nm; and at any position in a transmission path between a transmitter exit and a receiver entrance, an irradiance is set to at most $6.47 \cdot 10^{(L-700)/500}$ W/m$^2$) where the oscillation wavelength L (nm) of said laser is in a wavelength range of 950 nm to 1050 nm while to at most 32.3 (W/m$^2$) where the oscillation wavelength L is in a wavelength range of 1050 nm to 1400 nm.

Also, an optical space communication apparatus according to the present invention, achieving the above object, is an optical space communication apparatus using a laser as a radiative element and performing communication by making a light signal propagate in the atmosphere, wherein, under the environment in the entire operating temperature range of the optical space communication apparatus, in case a transmission distance of said optical space communication apparatus is between 100 m inclusive and 200 m, said laser is a laser with an oscillation wavelength L (nm) in a wavelength range of between 967 nm inclusive and 1110 nm or in a wavelength range of between 1165 nm inclusive and 1315 nm, whereas in case said transmission distance is not less than 200 m, said laser is a laser with an oscillation wavelength L (nm) in a wavelength range of between 986 nm inclusive and 1090 nm or in a wavelength range of between 1225 nm inclusive and 1295 nm; and at any position in a transmission path between a transmitter exit and a receiver entrance, an irradiance is set to at most $11.5 \cdot 10^{(L-700)/500}$ (W/m$^2$) where the oscillation wavelength L (nm) of said laser is in a wavelength range of 950 nm to 1050 nm while to at most 57.5 (W/m$^2$) where the oscillation wavelength L is in a wavelength range of 1050 nm to 1400 nm.

Also, an optical space communication apparatus according to the present invention, achieving the above object, is an optical space communication apparatus using a laser as a radiative element and performing communication by making a light signal propagate in the atmosphere, wherein in case a transmission distance of optical space communication is not less than 200 m, an irradiance at an arbitrary position in a transmission path is set to at most $6.47 \cdot 10^{(L-700)/500}$ (W/m$^2$) where L (nm) is a wavelength; and in an entire range of operating environmental temperature of the laser, the laser has an overall region of oscillation wavelength which is included in a range of between 735 nm inclusive and 759 nm, between 770 nm inclusive and 811 nm, or between 838 nm inclusive and 891 nm.

Also, an optical space communication apparatus according to the present invention, achieving the above object, is an optical space communication apparatus using a laser as a radiative element and performing communication by making a light signal propagate in the atmosphere, wherein in case a transmission distance of optical space communication is not less than 200 m, an irradiance at an arbitrary position in a transmission path is set to at most $11.5 \cdot 10^{(L-700)/500}$ (W/m$^2$) where L (nm) is a wavelength; and in an entire range of operating environment temperature of the laser, the laser has an overall region of oscillation wavelength which is included in a range of between 735 nm inclusive and 759 nm, between 770 nm inclusive and 811 nm, or between 838 nm inclusive and 891 nm.

Also, an optical space communication apparatus according to the present invention, achieving the above object, is an optical space communication apparatus using a laser as a radiative element and performing communication by making a light signal propagate in the atmosphere, wherein the laser oscillates with an oscillation wavelength L in a range of between 715 nm inclusive and 735 nm in a single longitudinal mode or in a mode approximate thereto;

wherein an output power of said laser is controlled such that an irradiance of said laser does not exceed $6.47 \cdot 10^{(L-700)/500}$ (W/m$^2$) in all region in a transmission path between a transmitting portion and a receiving portion; and the oscillation wavelength of the laser is so controlled as not to be included in a spectral range with a width of ±0.06 nm for a central value of each wavelength determined as follows: for a transmission distance of optical space communication between 200 m inclusive and 400 m, a first absorption spectral series comprising 716.94 nm, 718.36 nm, 718.66 nm, 718.83 nm, 718.93 nm, 719.36 nm, 719.55 nm, 720.25 nm, 720.33 nm, 720.63 nm, 720.86 nm, 723.67 nm, 724.28 nm, 724.58 nm, 725.44 nm, 726.76 nm, 727.56 nm, 727.94 nm, 729.24 nm, 730.66 nm; for a transmission distance between 400 m inclusive and 800 m, said first absorption spectral series and a second absorption spectral series comprising 715.99 nm, 716.49 nm, 716.54 nm, 722.56 nm, 722.94 nm, 723.49 nm, 724.78 nm, 724.94 nm, 725.57 nm, 726.66 nm, 727.71 nm, 728.91 nm, 730.53 nm, 732.08 nm; for a transmission distance of not less than 800 m, said first and second absorption spectral series and a third absorption spectral series comprising 716.27 nm, 719.70 nm, 720.05 nm, 721.16 nm, 721.86 nm, 725.09 nm, 725.21 nm, 726.00 nm, 727.20 nm, 728.99 nm, 729.71 nm, 730.19 nm, 731.15 nm, 731.45 nm, 731.76 nm, 732.93 nm, 733.29 nm, 733.58 nm.

Also, an optical space communication apparatus according to the present invention, achieving the above object, is an optical space communication apparatus using a laser as a radiative element and performing communication by making a light signal propagate in the atmosphere, wherein the laser oscillates with an oscillation wavelength L in a range of between 759 nm inclusive and 770 nm in a single longitudinal mode or in a mode approximate thereto;

wherein an output power of said laser is controlled such that an irradiance of said laser does not exceed $6.47 \cdot 10^{(L-700)/500}$ (W/m$^2$) in all region in a transmission path between a transmitting portion and a receiving portion; and the oscillation wavelength of the laser is so controlled as not to be included in a spectral range with a width of ±0.06 nm for a central value of each wavelength determined as follows: for a transmission distance of optical space communication between 200 m inclusive and 400 m, a fourth absorption spectral series comprising 759.61 nm, 759.66 nm, 759.73 nm, 759.84 nm, 759.97 nm, 760.03 nm, 760.08 nm, 760.28 nm, 760.39 nm, 760.44 nm, 760.57 nm, 760.66 nm, 760.78 nm, 760.89 nm, 761.00 nm, 761.14 nm, 761.25 nm, 761.34 nm, 761.42 nm, 761.53 nm, 761.73 nm, 761.84 nm, 762.32 nm, 762.54 nm, 762.66 nm, 762.91 nm, 763.05 nm, 763.32 nm, 763.44 nm, 763.72 nm, 763.86 nm, 764.17 nm, 764.28 nm, 764.62 nm, 764.73 nm, 765.10 nm, 765.21 nm, 765.61 nm, 765.72 nm, 766.15 nm, 766.26 nm, 766.71 nm, 766.80 nm, 767.28 nm, 767.39 nm, 767.88 nm, 767.97 nm; for a transmission distance between 400 m inclusive and 800 m, said fourth absorption spectral series and a fifth absorption spectral series comprising 768.47 nm and 768.59 nm; for a transmission distance of not less than 800 m, the fourth and fifth absorption spectral series and a sixth absorption spectral series comprising 769.13 nm and 769.22 nm.

Also, an optical space communication apparatus according to the present invention, achieving the above object, is an optical space communication apparatus using a laser as a radiative element and performing communication by making a light signal propagate in the atmosphere, wherein the laser oscillates with an oscillation wavelength L in a range of between 811 nm inclusive and 838 nm in a single longitudinal mode or in a mode approximate thereto;

wherein an output power of said laser is controlled such that an irradiance of said laser does not exceed $6.47 \cdot 10^{(L-700)/500}$ (W/m$^2$) in all region in a transmission path between a transmitting portion and a receiving portion; and the oscillation wavelength of the laser is so controlled as not to be included in a spectral range with a width of ±0.06 nm for a central value of each wavelength determined as follows: for a transmission distance of optical space communication between 200 m inclusive and 400 m, a seventh absorption spectral series comprising 813.60 nm, 815.07 nm, 815.20 nm, 815.71 nm, 816.03 nm, 816.38 nm, 816.45 nm, 816.67 nm, 817.22 nm, 817.93 nm, 818.41 nm, 818.87 nm, 819.16 nm, 819.55 nm, 820.00 nm, 822.63 nm, 822.93 nm, 823.06 nm, 823.35 nm, 823.61 nm, 824.58 nm, 825.88 nm, 827.66 nm, 827.89 nm, 828.18 nm, 828.42 nm, 829.04 nm, 829.18 nm, 829.64 nm, 830.24 nm, 830.74 nm, 832.04 nm, 832.37 nm; for a transmission distance between 400 m inclusive and 800 m, said seventh absorption spectral series and an eighth absorption spectral series comprising 811.59 nm, 813.73 nm, 814.30 nm, 814.43 nm, 814.62 nm, 815.49 nm, 817.09 nm, 820.29 nm, 820.46 nm, 822.05 nm, 823.22 nm, 830.67 nm, 831.44 nm, 831.84 nm, 833.21 nm, 834.15 nm, 835.15 nm, 835.93 nm, 836.43 nm; for a transmission distance of not less than 800 m, said seventh and eighth absorption spectral series and a ninth absorption spectral series comprising 813.28 nm, 813.89 nm, 814.85 nm, 814.94 nm, 815.61 nm, 818.06 nm, 818.16 nm, 821.46 nm, 822.37 nm, 823.97 nm, 824.24 nm, 825.52 nm, 826.21 nm, 826.57 nm, 827.46 nm, 835.59 nm, 836.97 nm.

Also, an optical space communication apparatus according to the present invention, achieving the above objects, is an optical space communication apparatus using a laser as a radiative element and performing communication by making a light signal propagate in the atmosphere, wherein the laser oscillates with an oscillation wavelength L in a range of between 891 nm inclusive and 930 nm in a single longitudinal mode or in a mode approximate thereto;

wherein an output power of said laser is controlled such that an irradiance of said laser does not exceed $6.47 \cdot 10^{(L-700)/500}$ (W/m$^2$) in all region in a transmission path between a transmitting portion and a receiving portion; and the oscillation wavelength of the laser is so controlled as not to be included in a spectral range with a width of ±0.06 nm for a central value of each wavelength determined as follows: for a transmission distance of optical space communication between 200 m inclusive and 400 m, a tenth absorption spectral series comprising 895.67 nm, 895.75 nm, 896.52 nm, 896.60 nm, 896.79 nm, 897.41 nm, 898.31 nm, 898.93 nm, 899.01 nm, 899.31 nm, 899.44 nm, 900.29 nm, 900.65 nm, 901.00 nm, 901.43 nm, 901.94 nm, 902.53 nm, 902.84 nm, 907.19 nm, 907.47 nm, 907.70 nm, 908.22 nm, 908.33 nm, 908.98 nm, 910.25 nm, 910.81 nm, 912.05 nm, 913.22 nm, 913.90 nm, 915.55 nm, 915.84 nm, 917.66 nm, 917.74 nm, 917.94 nm, 919.82 nm, 921.99 nm, 928.13 nm, 928.75 nm, 929.59 nm, 929.80 nm, 930.05 nm; for a transmission distance between 400 m inclusive and 800 m, said tenth absorption spectral series and an eleventh absorption spectral series comprising 893.66 nm, 894.47 nm, 894.53 nm, 895.13 nm, 895.46 nm, 896.91 nm, 897.72 nm, 899.16 nm, 903.20 nm, 904.54 nm, 905.56 nm, 910.97 nm, 913.14 nm, 917.05 nm, 918.72 nm, 919.49 nm, 921.74 nm, 922.48 nm, 922.75 nm, 923.75 nm, 924.95 nm, 925.36 nm, 928.26 nm, 928.92 nm, 929.34 nm; for a transmission distance of not less than 800 m, said tenth and eleventh absorption spectral series and a twelfth absorption spectral series comprising 891.36 nm, 893.12 nm, 896.09 nm, 899.24 nm, 906.31 nm, 906.55 nm, 906.63 nm, 907.26 nm, 907.34 nm, 909.49 nm, 909.61 nm, 909.77 nm, 913.50 nm, 913.70 nm, 915.27 nm, 921.53 nm, 924.78 nm, 926.31 nm, 927.59 nm, 929.25 nm.

Also, an optical space communication apparatus according to the present invention, achieving the above object, is an optical space communication apparatus using a laser as a radiative element and performing communication by making a light signal propagate in the atmosphere, wherein the laser oscillates with an oscillation wavelength L in a range of between 715 nm inclusive and 735 nm in a single longitudinal mode or in a mode approximate thereto;

wherein an output power of said laser is controlled such that an irradiance of said laser does not exceed $11.5 \cdot 10^{(L-700)/500}$ (W/m$^2$) in all region in a transmission path between a transmitting portion and a receiving portion; and the oscillation wavelength of the laser is so controlled as not to be included in a spectral range with a width of ±0.06 nm for a central value of each wavelength determined as follows: for a transmission distance of optical space communication between 200 m inclusive and 400 m, a first absorption spectral series comprising 716.94 nm, 718.36 nm, 718.66 nm, 718.83 nm, 718.93 nm, 719.36 nm, 719.55 nm, 720.25 nm, 720.33 nm, 720.63 nm, 720.86 nm, 723.67 nm, 724.28 nm, 724.58 nm, 725.44 nm, 726.76 nm, 727.56 nm, 727.94 nm, 729.24 nm, 730.66 nm; for a transmission distance between 400 m inclusive and 800 m, said first absorption spectral series and a second absorption spectral series comprising 715.99 nm, 716.49 nm, 716.54 nm, 722.56 nm, 722.94 nm, 723.49 nm, 724.78 nm, 724.94 nm, 725.57 nm, 726.66 nm, 727.71 nm, 728.91 nm, 730.53 nm, 732.08 nm; for a transmission distance of not less than 800 m, said first and second absorption spectral series and a third absorption spectral series comprising 716.27 nm, 719.70 nm, 720.05 nm, 721.16 nm, 721.86 nm, 725.09 nm, 725.21 nm, 726.00 nm, 727.20 nm, 728.99 nm, 729.71 nm, 730.19 nm, 731.15 nm, 731.45 nm, 731.76 nm, 732.93 nm, 733.29 nm, 733.58 nm.

Also, an optical space communication apparatus according to the present invention, achieving the above objects, is an optical space communication apparatus using a laser as a radiative element and performing communication by making a light signal propagate in the atmosphere, wherein the laser oscillates with an oscillation wavelength L in a range of between 759 nm inclusive and 770 nm in a single longitudinal mode or in a mode approximate thereto;

wherein an output power of said laser is controlled such that an irradiance of said laser does not exceed $11.5 \cdot 10^{(L-700)/500}$ (W/m$^2$) in all region in a transmission path between a transmitting portion and a receiving portion; and the oscillation wavelength of the laser is so controlled as not to be included in a spectral range with a width of ±0.06 nm for a central value of each wavelength determined as follows: for a transmission distance of optical space communication between 200 m inclusive and 400 m, a fourth absorption spectral series comprising 759.61 nm, 759.66 nm, 759.73 nm, 759.84 nm, 759.97 nm, 760.03 nm, 760.08 nm, 760.28 nm, 760.39 nm, 760.44 nm, 760.57 nm, 760.66 nm, 760.78 nm, 760.89 nm, 761.00 nm, 761.14 nm, 761.25 nm, 761.34 nm, 761.42 nm, 761.53 nm, 761.73 nm, 761.84 nm, 762.32 nm, 762.54 nm, 762.66 nm, 762.91 nm, 763.05 nm, 763.32 nm, 763.44 nm, 763.72 nm, 763.86 nm, 764.17 nm, 764.28 nm, 764.62 nm, 764.73 nm, 765.10 nm, 765.21 nm, 765.61 nm, 765.72 nm, 766.15 nm, 766.26 nm, 766.71 nm, 766.80 nm, 767.28 nm, 767.39 nm, 767.88 nm, 767.97 nm; for a transmission distance between 400 m inclusive and 800 m, said fourth absorption spectral series and a fifth absorption spectral series comprising 768.47 nm and 768.59 nm; for a transmission distance of not less than 800 m, the fourth and fifth absorption spectral series and a sixth absorption spectral series comprising 769.13 nm and 769.22 nm.

Also, an optical space communication apparatus according to the present invention, achieving the above objects, is an optical space communication apparatus using a laser as a radiative element and performing communication by making a light signal propagate in the atmosphere, wherein the laser oscillates with an oscillation wavelength L in a range of between 811 nm inclusive and 838 nm in a single longitudinal mode or in a mode approximate thereto;

an output power of said laser is controlled such that an irradiance of said laser does not exceed $11.5 \cdot 10^{(L-700)/500}$ (W/m$^2$) in all region in a transmission path between a transmitting portion and a receiving portion; and the oscillation wavelength of the laser is so controlled as not to be included in a spectral range with a width of ±0.06 nm for a central value of each wavelength determined as follows: for a transmission distance of optical space communication between 200 m inclusive and 400 m, a seventh absorption spectral series comprising 813.60 nm, 815.07 nm, 815.20 nm, 815.71 nm, 816.03 nm, 816.38 nm, 816.45 nm, 816.67 nm, 817.22 nm, 817.93 nm, 818.41 nm, 818.87 nm, 819.16 nm, 819.55 nm, 820.00 nm, 822.63 nm, 822.93 nm, 823.06 nm, 823.35 nm, 823.61 nm, 824.58 nm, 825.88 nm, 827.66 nm, 827.89 nm, 828.18 nm, 828.42 nm, 829.04 nm, 829.18 nm, 829.64 nm, 830.24 nm, 830.74 nm, 832.04 nm, 832.37 nm; for a transmission distance between 400 m inclusive and 800 m, said seventh absorption spectral series and an eighth absorption spectral series comprising 811.59 nm, 813.73 nm, 814.30 nm, 814.43 nm, 814.62 nm, 815.49 nm, 817.09 nm, 820.29 nm, 820.46 nm, 822.05 nm, 823.22 nm, 830.67 nm, 831.44 nm, 831.84 nm, 833.21 nm, 834.15 nm, 835.15 nm, 835.93 nm, 836.43 nm; for a transmission distance of not less than 800 m, said seventh and eighth absorption spectral series and a ninth absorption spectral series comprising 813.28 nm, 813.89 nm, 814.85 nm, 814.94 nm, 815.61 nm, 818.06 nm, 818.16 nm, 821.46 nm, 822.37 nm, 823.97 nm, 824.24 nm, 825.52 nm, 826.21 nm, 826.57 nm, 827.46 nm, 835.59 nm, 836.97

Also, an optical space communication apparatus according to the present invention, achieving the above objects, is an optical space communication apparatus using a laser as a radiative element and performing communication by making a light signal propagate in the atmosphere, wherein the laser oscillates with an oscillation wavelength L in a range of between 891 nm inclusive and 930 nm in a single longitudinal mode or in a mode approximate thereto;

wherein an output power of said laser is controlled such that an irradiance of said laser does not exceed $11.5 \cdot 10^{(L-700)/500}$ (W/m$^2$) in all region in a transmission path between a transmitting portion and a receiving portion; and the oscillation wavelength of the laser is so controlled as not to be included in a spectral range with a width of ±0.06 nm for a central value of each wavelength determined as follows: for a transmission distance of optical space communication between 200 m inclusive and 400 m, a tenth absorption spectral series comprising 895.67 nm, 895.75 nm, 896.52 nm, 896.60 nm, 896.79 nm, 897.41 nm, 898.31 nm, 898.93 nm, 899.01 nm, 899.31 nm, 899.44 nm, 900.29 nm, 900.65 nm, 901.00 nm, 901.43 nm, 901.94 nm, 902.53 nm, 902.84 nm, 907.19 nm, 907.47 nm, 907.70 nm, 908.22 nm, 908.33 nm, 908.98 nm, 910.25 nm, 910.81 nm, 912.05 nm, 913.22 nm, 913.90 nm, 915.55 nm, 915.84 nm, 917.66 nm, 917.74 nm, 917.94 nm, 919.82 nm, 921.99 nm, 928.13 nm, 928.75 nm, 929.59 nm, 929.80 nm, 930.05 nm; for a transmission distance between 400 m inclusive and 800 m, said tenth absorption spectral series and an eleventh absorption spectral series comprising 893.66 nm, 894.47 nm, 894.53 nm, 895.13 nm, 895.46 nm, 896.91 nm, 897.72 nm, 899.16 nm, 903.20 nm, 904.54 nm, 905.56 nm, 910.97 nm, 913.14 nm, 917.05 nm, 918.72 nm, 919.49 nm, 921.74 nm, 922.48 nm, 922.75 nm, 923.75 nm, 924.95 nm, 925.36 nm, 928.26 nm, 928.92 nm, 929.34 nm; for a transmission distance of not less than 800 m, said tenth and eleventh absorption spectral series and a twelfth absorption spectral series comprising 891.36 nm, 893.12 nm, 896.09 nm, 899.24 nm, 906.31 nm, 906.55 nm, 906.63 nm, 907.26 nm, 907.34 nm, 909.49 nm, 909.61 nm, 909.77 nm, 913.50 nm, 913.70 nm, 915.27 nm, 921.53 nm, 924.78 nm, 926.31 nm, 927.59 nm, 929.25 nm.

DETAILED DESCRIPTION OF THE PREFERRED EMBODIMENTS

The present invention will be described in detail, based on the embodiments shown in FIG. 15 to FIG. 17.

Figure 15:
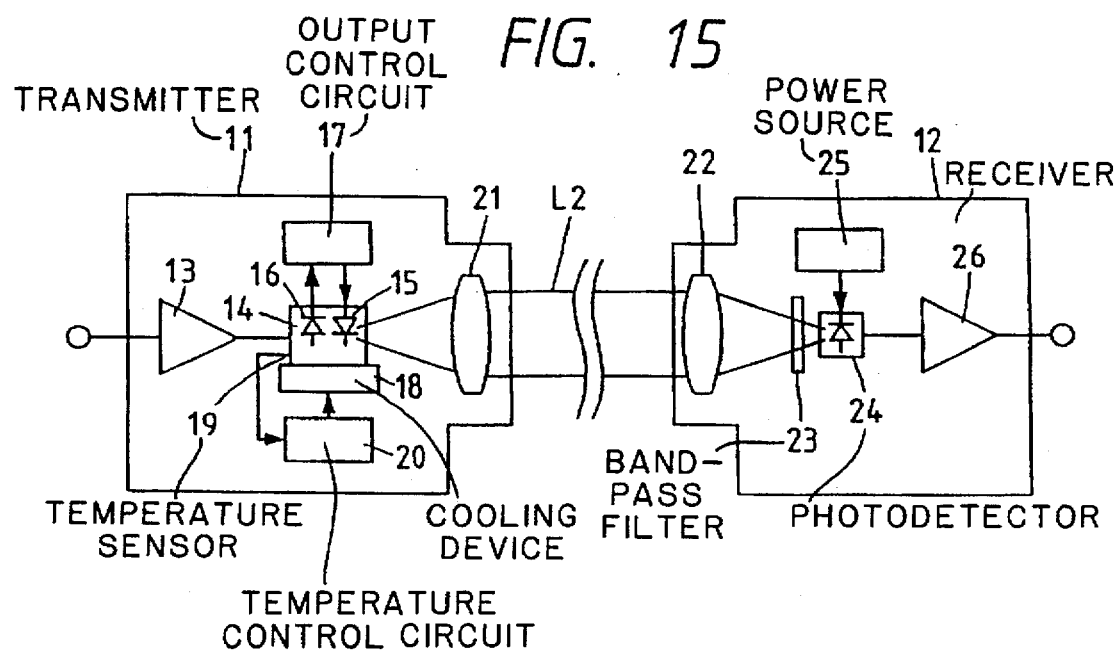
FIG. 15 is a schematic diagram to show a first embodiment.

FIG. 15 is a schematic diagram to show the first embodiment of optical space communication apparatus according to the present invention, in which a transmitter 11 and a receiver 12 are opposed to each other. An input signal enters an amplifier 13, which is connected to a semiconductor laser 15 arranged in a package 14. An output monitoring photodiode 16 is provided in the package 14 to detect an output from the semiconductor laser 15, and an output terminal of the output monitoring photodiode 16 is connected to an output control circuit 17 for controlling the semiconductor laser 15. Further, there are a cooling device 18 and a temperature sensor 19 provided in the package 14. An output terminal of the temperature sensor 19 is connected to a temperature control circuit 20 for controlling the cooling device 18. A light beam from the semiconductor laser 15 passes through a collimating lens 21 and then the collimated beam is transmitted toward the receiver 12. The semiconductor laser 15 oscillates in the single longitudinal mode or in a mode approximate thereto.

The receiver 12 has a collecting optical system 22, a band-pass filter 23 and a photodetector 24 arranged in series on an optical path from the transmitter 11. Connected to the photodetector 24 is a power source 25 for supplying a high bias voltage thereto. Further, an output signal is output from the photodetector 24 through an amplifier 26.

In transmission, the input signal is input into the package 14 after being amplified by the amplifier 13, and the semiconductor laser 15 converts the input signal into a light signal. Oscillation light of semiconductor laser 15 is collimated by the collimating lens 21 into a parallel beam L2 and the thus collimated beam is sent into the space. In this occasion, the output control circuit 17 executes the so-called APC (Auto Power Control) operation. That is, the output control circuit 17 compares the signal from the output monitoring photodiode 16 with a reference value preliminarily set and controls a forward direct current of semiconductor laser 15 while keeping the output from semiconductor laser 15 constant. Also, the temperature sensor 19 detects the temperature of the package 14, which is cooled according to the output from the temperature control circuit 20.

Although the output power of the semiconductor laser 15 under the control of APC should be preferably set as high as possible from the demand on communication, it must be determined taking the safety to human eye into consideration, as described in the conventional cases. For example, JIS-C6802 shows a safety standard for lasers including the semiconductor laser as an index of safety, which defines exposure on human eye and maximum permissible exposure (MPE) on cornea, as shown in Table 1.

TABLE 1

| Wavelength L (nm) | Exposure Time t (sec) | | | | | | | | Limit Aperture (mm) |
|---|---|---|---|---|---|---|---|---|---|
| | $<10^{-9}$ | $10^{-9}$ to $10^{-7}$ | $10^{-7}$ to $1.8 \cdot 10^{-5}$ | $1.8 \cdot 10^{-5}$ to $5 \cdot 10^{-5}$ | $5 \cdot 10^{-5}$ to 10 | 10 to $10^3$ | $10^3$ to $10^4$ | $10^4$ to $3 \cdot 10^4$ | |
| 200 to 302.5 | $3 \cdot 10^{10}$ W·m$^{-2}$ | | | 30 J·m$^{-2}$ | | | | | 1 |
| 302.5 to 315 | | | $C_1$ J·m$^{-2}$ (t < $T_1$) $C_2$ J·m$^{-2}$ (t < $T_2$) | | | | $C_2$ J·m$^{-2}$ | | |
| 315 to 400 | | | $C_1$ J·m$^{-2}$ | | | | $10^4$ J·m$^{-2}$ | 10 W·m$^{-2}$ | |
| 400 to 550 | $5 \cdot 10^6$ W·m$^{-2}$ | $5 \cdot 10^{-3}$ J·m$^{-2}$ | | | $18 \cdot t^{0.75}$ J·m$^{-2}$ | 100 J·m$^{-2}$ | | $10^{-2}$ W·m$^{-2}$ | 7 |
| 550 to 700 | | | | | | $18 \cdot t^{0.75}$ J·m$^{-2}$ (t < $T_2$) $C_3 \cdot 10^2$ J·m$^{-2}$ (t ≥ $T_2$) | | $C_3 \cdot 10^2$ W·m$^{-2}$ | |
| 700 to 1050 | $5 \cdot C_4 \cdot 10^6$ W·m$^{-2}$ | $5 \cdot C_4 \cdot 10^{-3}$ J·m$^{-2}$ | | | $18 \cdot C_4 \cdot t^{0.75}$ J·m$^{-2}$ | | | $3.2 \cdot C_4$ W·m$^{-2}$ | |
| 1050 to 1400 | $5 \cdot 10^7$ W·m$^{-2}$ | | $5 \cdot 10^{-2}$ J·m$^{-2}$ | | | $90 \cdot t^{0.75}$ J·m$^{-2}$ | | 16W·m$^{-2}$ | |
| 1400 to $10^5$ | $10^{11}$ W·m$^{-2}$ | 100 J·m$^{-2}$ | | $5600 \cdot t^{0.25}$ J·m$^{-2}$ | | | 100 W·m$^2$ | | 1 |
| $10^5$ to $10^6$ | | | | | | | | | 11 |

$C_4 = 10^{(L-700)/500}$

In the present embodiment, the output from the output control circuit 17 to the semiconductor laser 15 is set such that the irradiance never exceeds the MPE at the emission port of the transmitter 11, that is, at the exit of the collimating lens 21. Therefore, the collimated beam L2 would be safe even if it were seen directly by a bare eye at any position in the optical path between the transmitter 11 and the receiver 12. Normally, since a beam has an angle of divergence more or less, the irradiance is highest at the exit of the transmitter 11 under the conditions.

Incidentally, although Table 1 shows the exposure time t as "time which can be present in actual applications," there is no clear definition of how to determine the exposure time t. The infrared optical space communication apparatus of the present invention is not intended to be used with works in which an operator has to intentionally look into the transmitter 11 through the collimating lens 21. Therefore, the actually possible time is normally about several seconds. However, if the workers include not only specific workers but also unspecified third persons, it becomes difficult to anticipate the "time which can be possibly present in actual applications" and therefore the time should be estimated longer. Then, with a safety factor of about 10, the exposure time may be set to 60 seconds, which would be enough to assure the safety.

Obtaining MPE from Table 1 for the exposure time of 60 seconds for wavelength L (nm) in the infrared region of about 1000 nm to 1400 nm, the MPE may be calculated by Equation (1) as defined below in case of the wavelength L (nm) being in the range of 950 nm to 1050 nm and by Equation (2) also defined below in case of the wavelength L (nm) being in the range of 1050 nm to 1400 nm. Table 1 expresses MPE as radiation energy, but it can be expressed as irradiance H (W/m²) in this case because the beam is continuous oscillation light.

$$H=6.47 \cdot C_4, \text{ where } C_4=10^{(L-700)/500} \ (W/m^2) \quad (1)$$

$$H=32.3 \ (W/m^2) \quad (2)$$

For example, if a semiconductor laser 15 employed has the wavelength L (nm) of about 1000 nm, the MPE is 25.7 (W/m²) from Equation (1). A beam from the semiconductor laser 15 has a Gaussian intensity distribution in which the central portion has a strong intensity. Let us consider a case that the diameter of collimating lens 21 is 100 mm and f-value of the lens is about 1.8. Then, in order to keep the maximum irradiance of the central portion of collimated beam L2 below 25.7 (W/m²), the output power of the semiconductor laser 15 must be set below 37 mW. It is needless to mention that the power must be set lower than this value if the diameter of collimating lens 21 is smaller than it.

Meanwhile, Equations (1) and (2) as described above were obtained for the case of workers including unspecified third persons.

However, considering the characteristics of the apparatus which performs communication by propagation of light beam in space, it is hardly conceivable from the viewpoint of practical use that the apparatus is set at a position where an unspecified third person could interrupt communication by looking into the light beam. Also, considering the scattering due to rain or fog and the attenuation due to the Mie scattering, a higher output power is advantageous to keep the reliability of communication high.

From the above reason, the "time which can be possibly present in actual applications" can be set as about several seconds, whereby the safety is assured in the practical region and the output can be kept high to maintain the reliability of communication high. Estimating the aforementioned "several seconds" as high as possible, the exposure time t is set to six seconds. Then, Equations (3) and (4) as follows provide the irradiance calculated from Table 1.

$$H=11.5 \cdot C_4, \text{ where } C_4=10^{(L-700)/500} \ (W/m^2) \quad (3)$$

$$H=57.5 \ (W/m^2) \quad (4)$$

For example, if a semiconductor laser 15 employed has the wavelength L (nm) of about 1000 nm, the MPE is 45.7 (W/m²) from Equation (3). A beam from the semiconductor laser 15 has a Gaussian intensity distribution in which the central portion has a strong intensity. Let us consider a case that the diameter of collimating lens 21 is 100 nm and f-value of the lens is about 1.8. Then, in order to keep the maximum irradiance of the central portion of the collimated beam L2 below 45.7 (W/m²), the output power of the semiconductor laser 15 must be kept below 65.8 mW. It is needless to mention that the output must be kept lower than this value if the diameter of collimating lens 21 is smaller than it.

If some measure is required for unspecified third person in particular, the apparatus may have for example a mechanism for inserting an optical attenuation filter between the semiconductor laser 15 and the collimating lens 21 only in necessary occasions in FIG. 15 or a function to decrease the output from the semiconductor laser 15 only in necessary occasions by changing the setting of the output control circuit 17.

In FIG. 15, the cooling device 18 is for restricting to some extent a change in oscillation wavelength of the semiconductor laser 15 and for preventing a rise in operating temperature of the semiconductor laser 15 to extend the life thereby. However, the cooling device 18 is not controlling the temperature of the semiconductor laser 15 in a strict fashion. If the temperature of the operating environment is in the range of about −10° to +60° C., the oscillating wavelength could have a change of about 10 nm. Thus, the semiconductor laser 15 must be one satisfying the required wavelength conditions within the entire temperature range in operating environment in addition to the standard oscillation wavelength which is usually defined by a value at room temperature.

For long distance transmission under such a condition that the output of the semiconductor laser 15 is limited because of the safety, the wavelength conditions must be determined to obtain transmission properties necessary for long distance transmission while accurately grasping the propagation properties of light in the atmosphere, for example locations and magnitudes of absorption spectra, the scattering, etc.

A permissible value of attenuation of light due to the absorption in the atmosphere depends upon the system of communication or the type of signal, and cannot be determined uniquely. It is usual that the system cannot be designed with a too large margin from the limits for example of cost. Then an appropriate permissible value of attenuation is in the range of about 3 dB to 6 dB (which is a half to a quarter in intensity).

Actually, general light receivers are designed with a minimum receiving level of about −30 dBm to −40 dBm. Using Equations (1) and (2) as described above, the output power may be controlled at about 37 mW (about 16 dBm) for the minimum receiving level, taking the safety into consideration. In that case, the receiving efficiency is about 20 dB to 23 dB with a loss on the way due to divergence and eccentricity of beam, a loss due to the scattering by rain or fog is at most about 16 dB, which is an addition of a limit of 13 dB and a margin of 3 dB, and a level drop due to scintillation change is 3 dB to 6 dB. A light power at the receiving point calculated from the above values is about 23 dBm to 29 dBm. It is, therefore, seen that an appropriate permissible amount of loss including attenuation due to absorption other than the above is about 7 dB to 10 dB. In this example, the permissible amount of only the loss due to absorption is set up at the highest attenuation of 6 dB as standard.

Also, the general light receivers are designed with a minimum receiving level of about −30 dBm to −40 dBm. Using Equations (3) and (4) as described above, the output power may be controlled at about 65 mW (about 18 dBm) for the minimum receiving level, taking the safety into consideration. In that case, the receiving efficiency is about 20 dB to 23 dB with a loss on the way due to divergence and eccentricity of beam, a loss due to the scattering by rain or fog is at most about 16 dB, which is an addition of a limit of 13 dB and a margin of 3 dB, and a level drop due to scintillation change is 3 dB to 6 dB. A light power at the receiving point calculated from the above values is about −21 dBm to −27 dBm. It is, therefore, seen that an appropriate permissible amount of loss including attenuation due to absorption other than the above is about 9 dB to 13 dB. In this example, the permissible amount of only the loss due to absorption is set up at the highest attenuation of 6 dB as standard.

Figure 1:
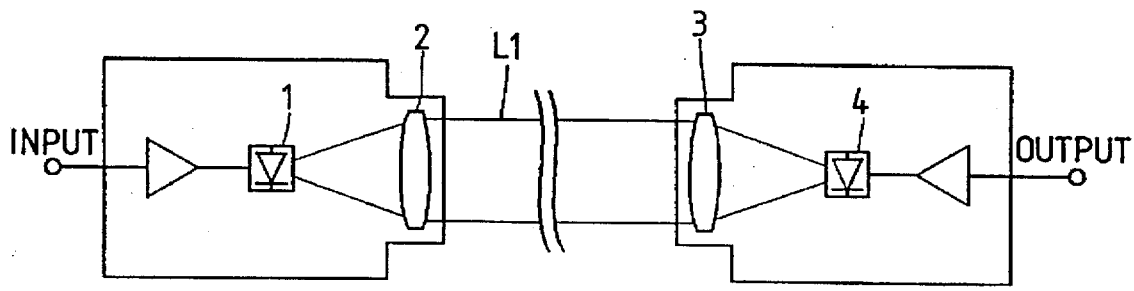
FIG. 1 is a schematic diagram of a conventional example.
Figure 2:
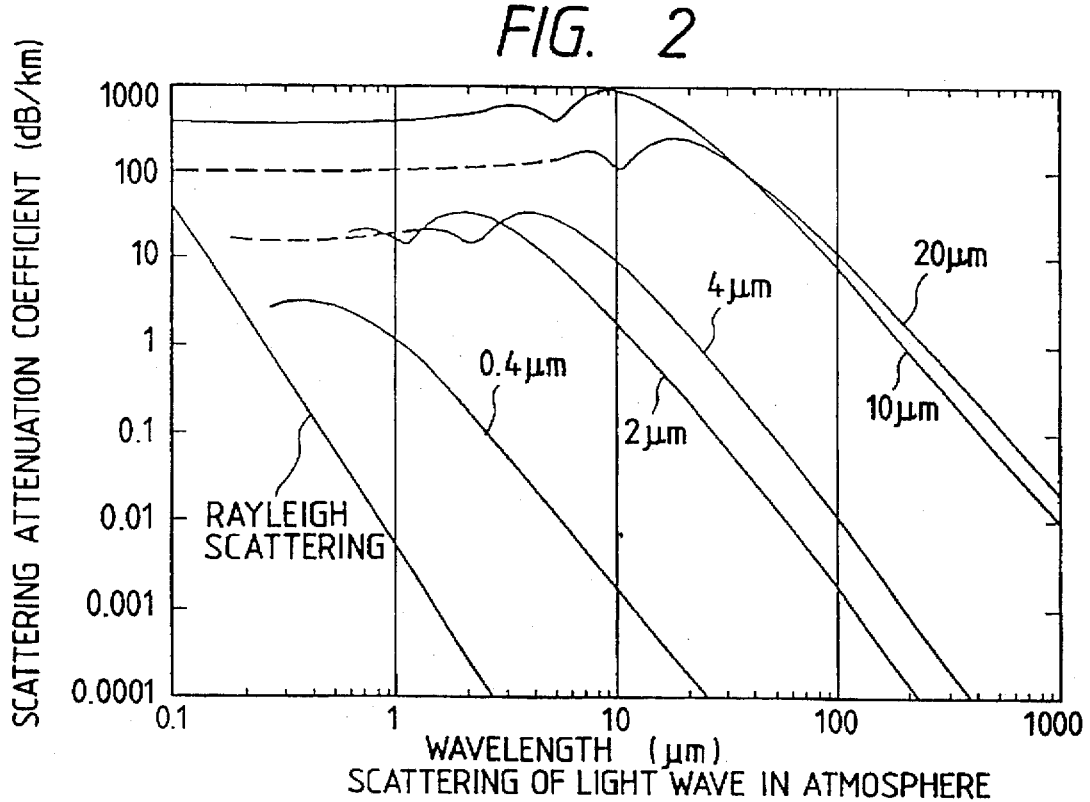
FIG. 2 is a graph to show scattering characteristics of the Mie scattering.
Figure 3:
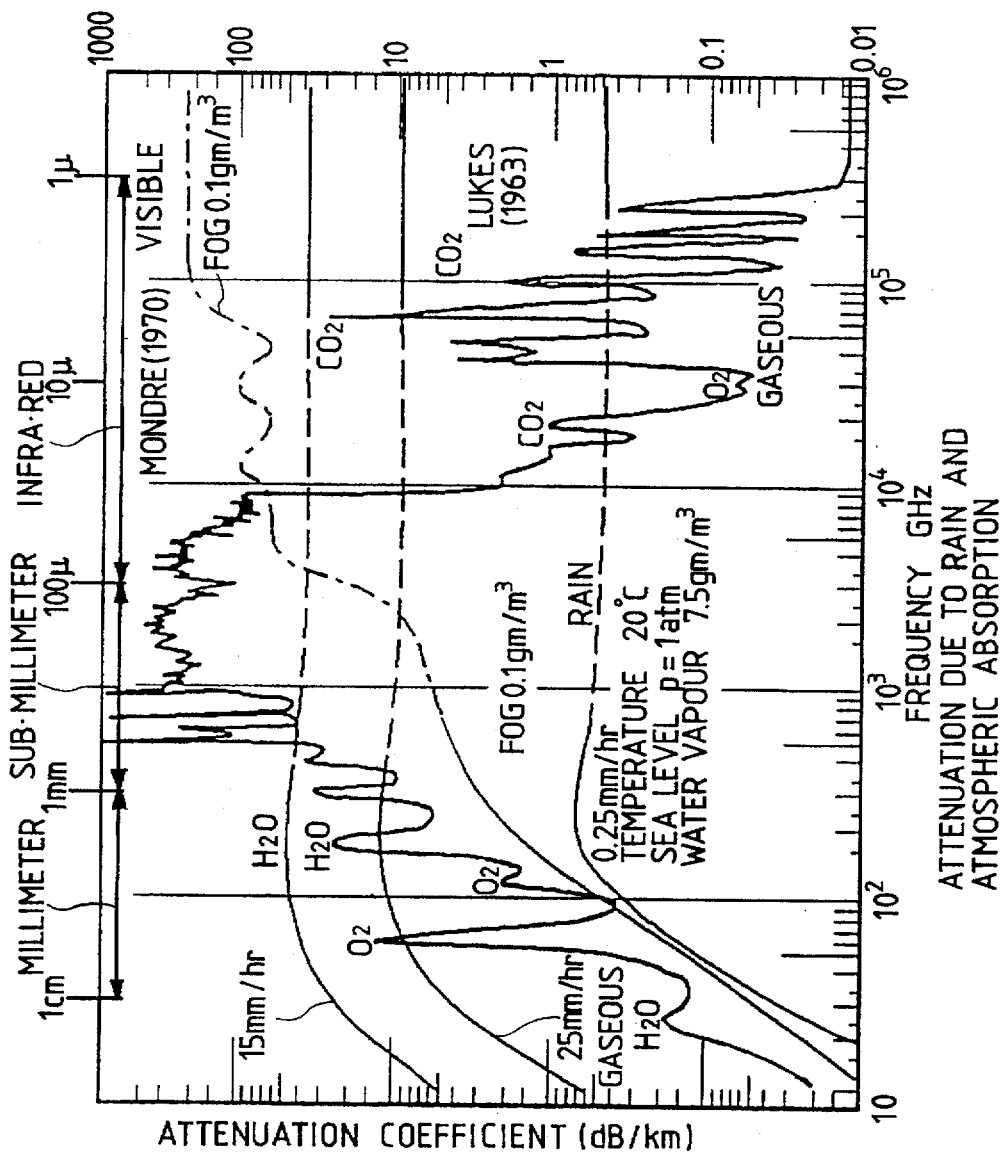
FIG. 3 is a graph to show an absorption spectrum by molecules in the atmosphere.
Figure 4:
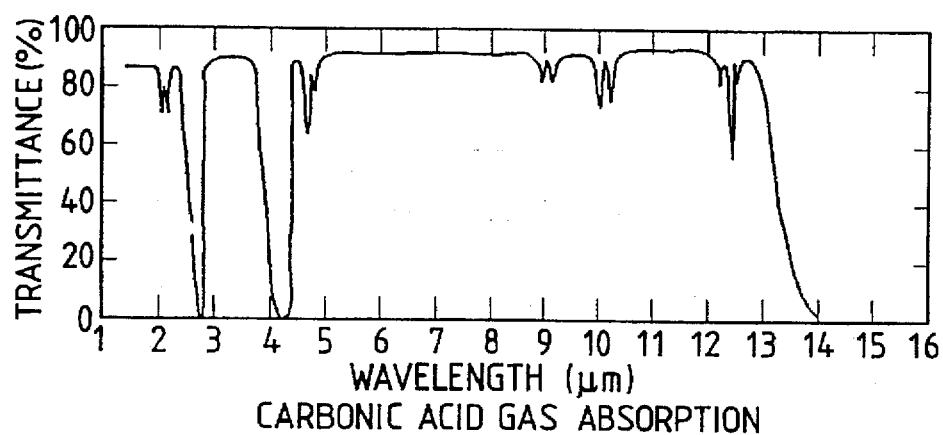
FIG. 4 is a graph to show an absorption spectrum by carbon dioxide.
Figure 5:
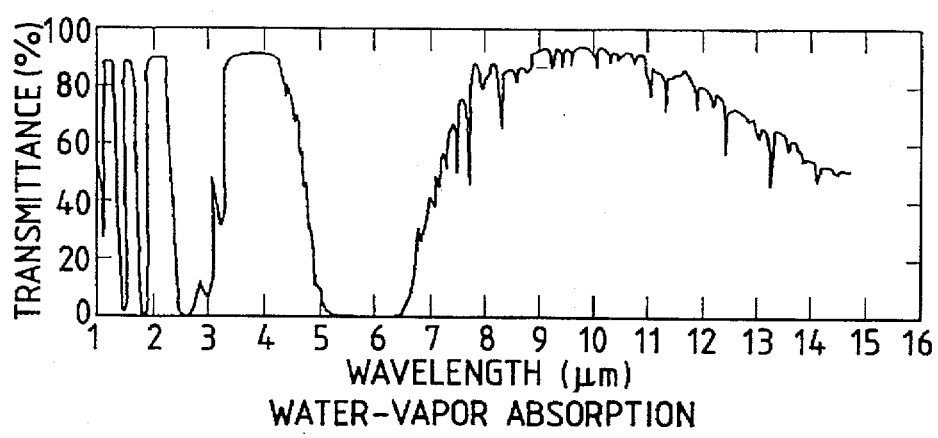
FIG. 5 is a graph to show an absorption spectrum by water vapor.
Figure 6:
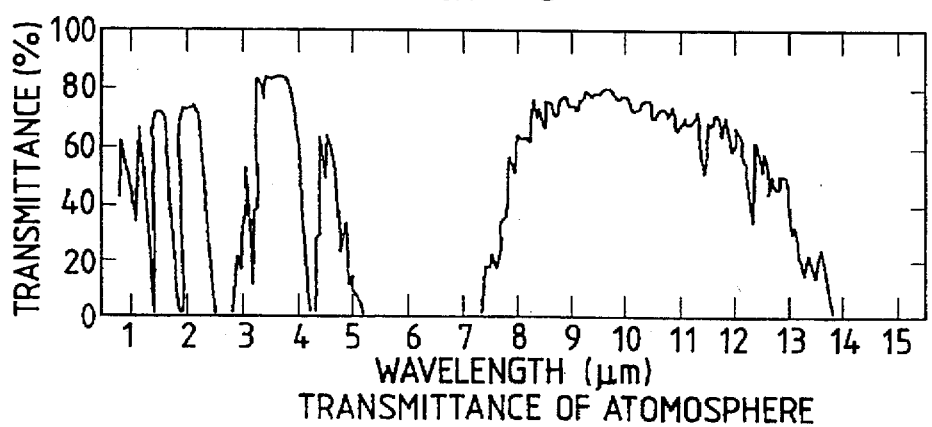
FIG. 6 is a graph to show a transmittance of the atmosphere.
Figure 7:
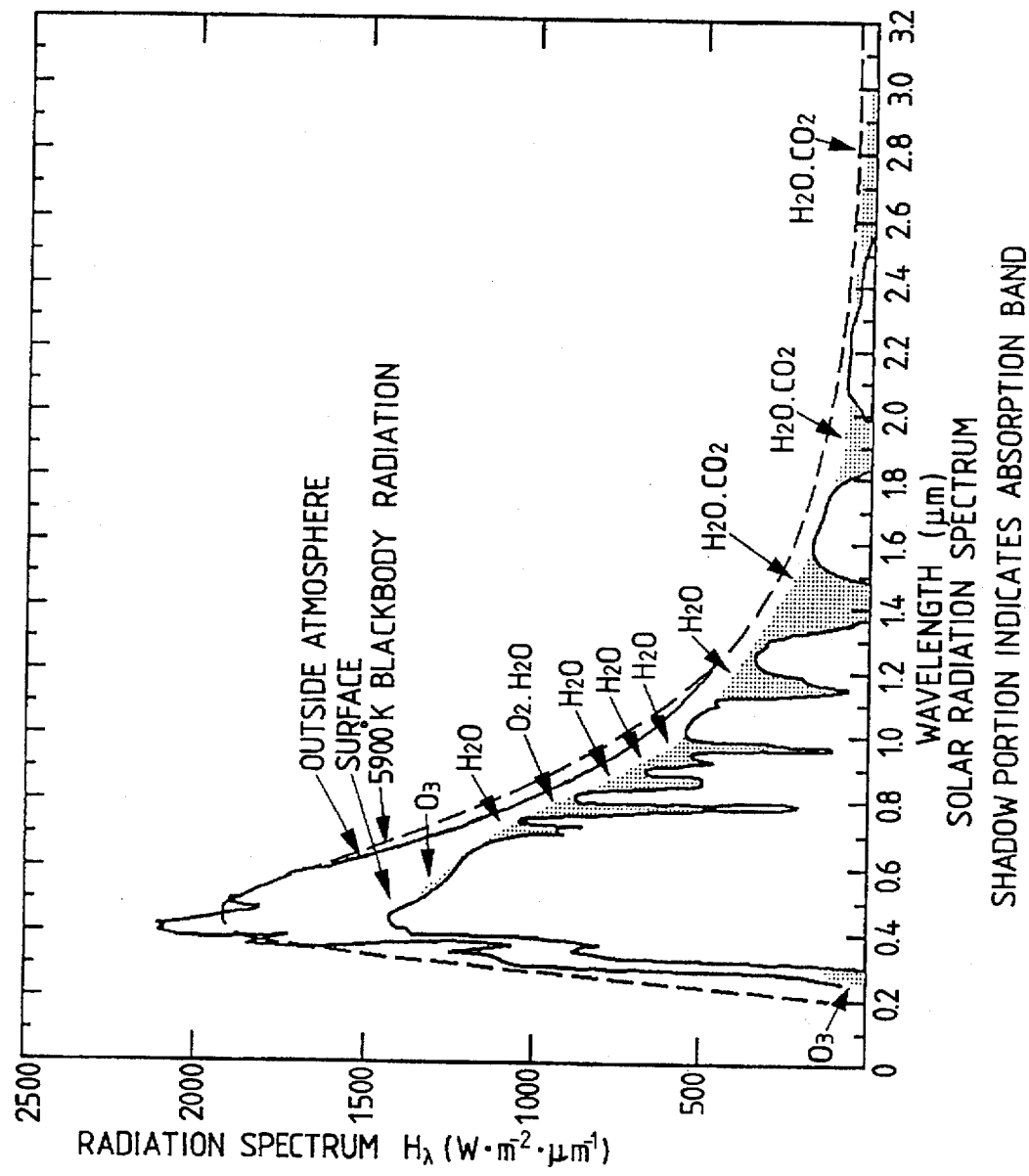
FIG. 7 is a graph to show a spectral distribution of solar radiation.
Figure 8:
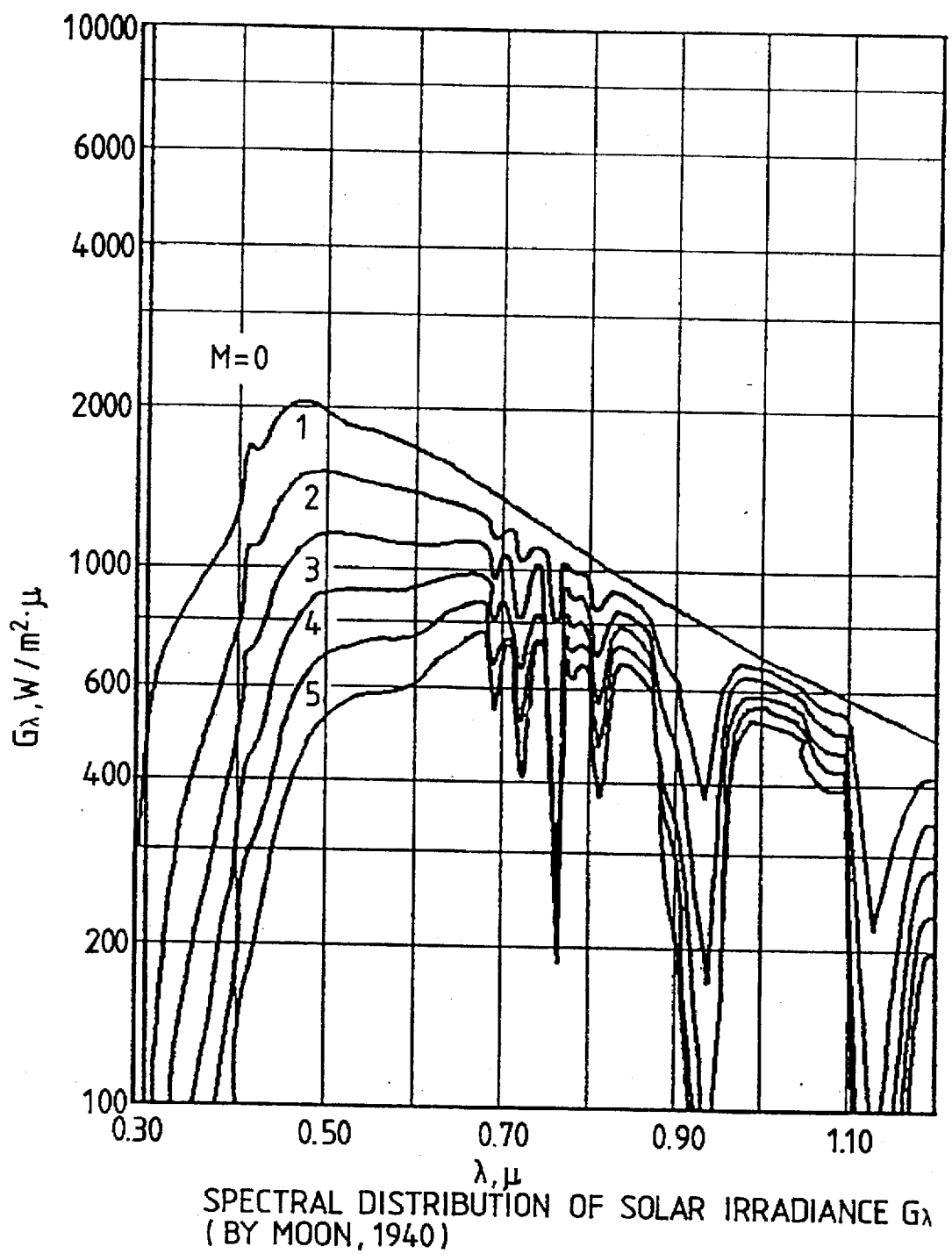
FIG. 8 is a graph to show a spectral distribution of solar radiation.
Figure 9:
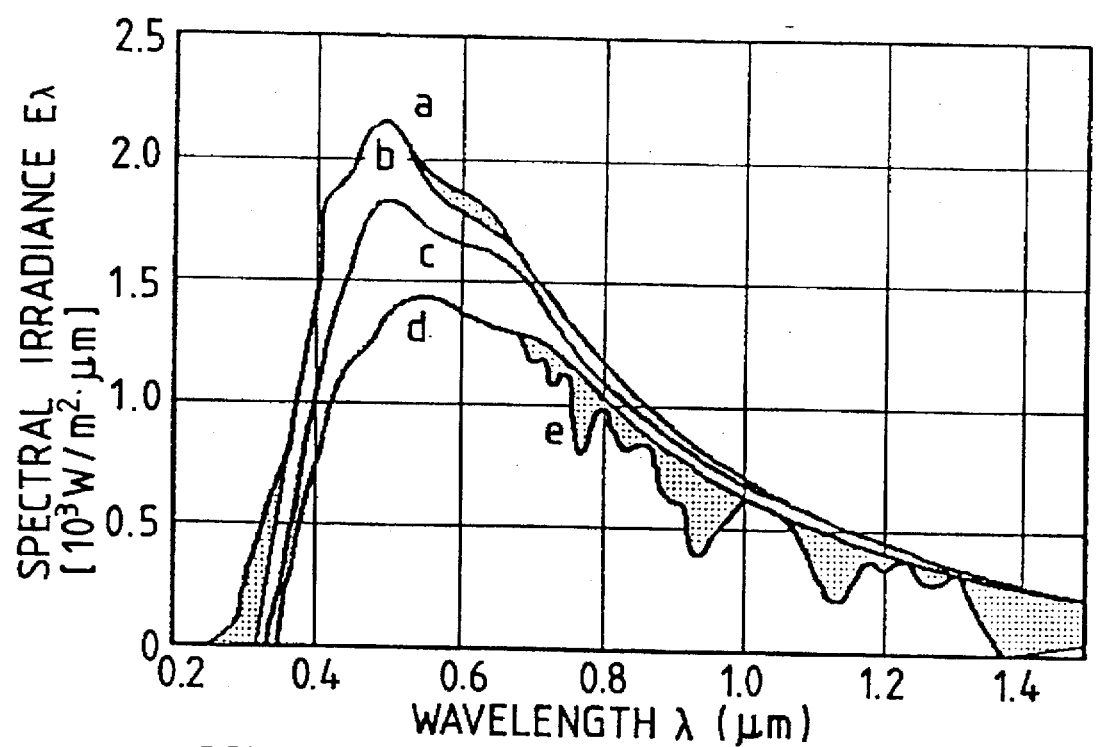
FIG. 9 is a graph to show a spectral distribution of solar radiation.
Figure 10:
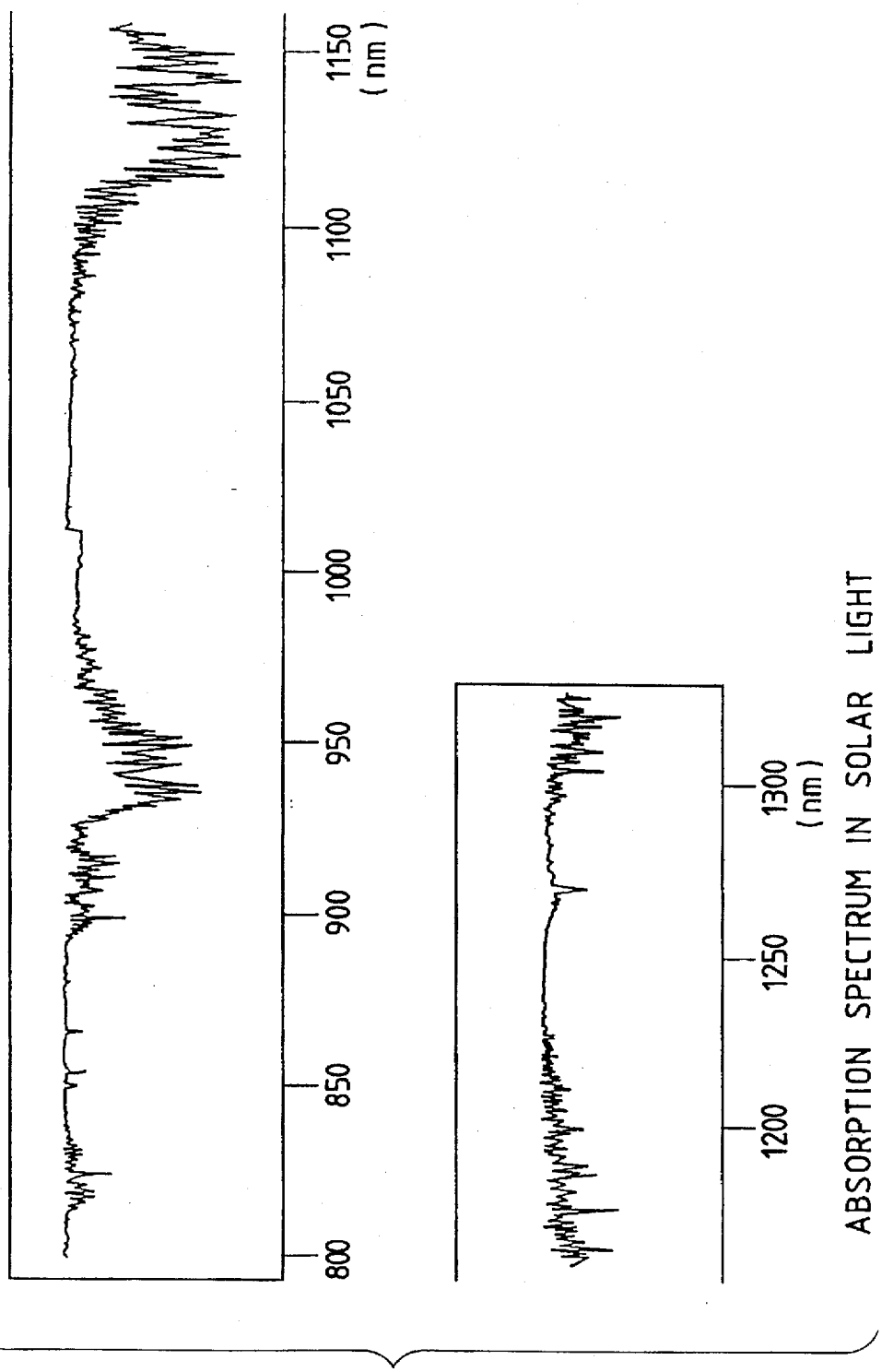
FIG. 10 is a graph to show an absorption spectrum of solar radiation.
Figure 11:
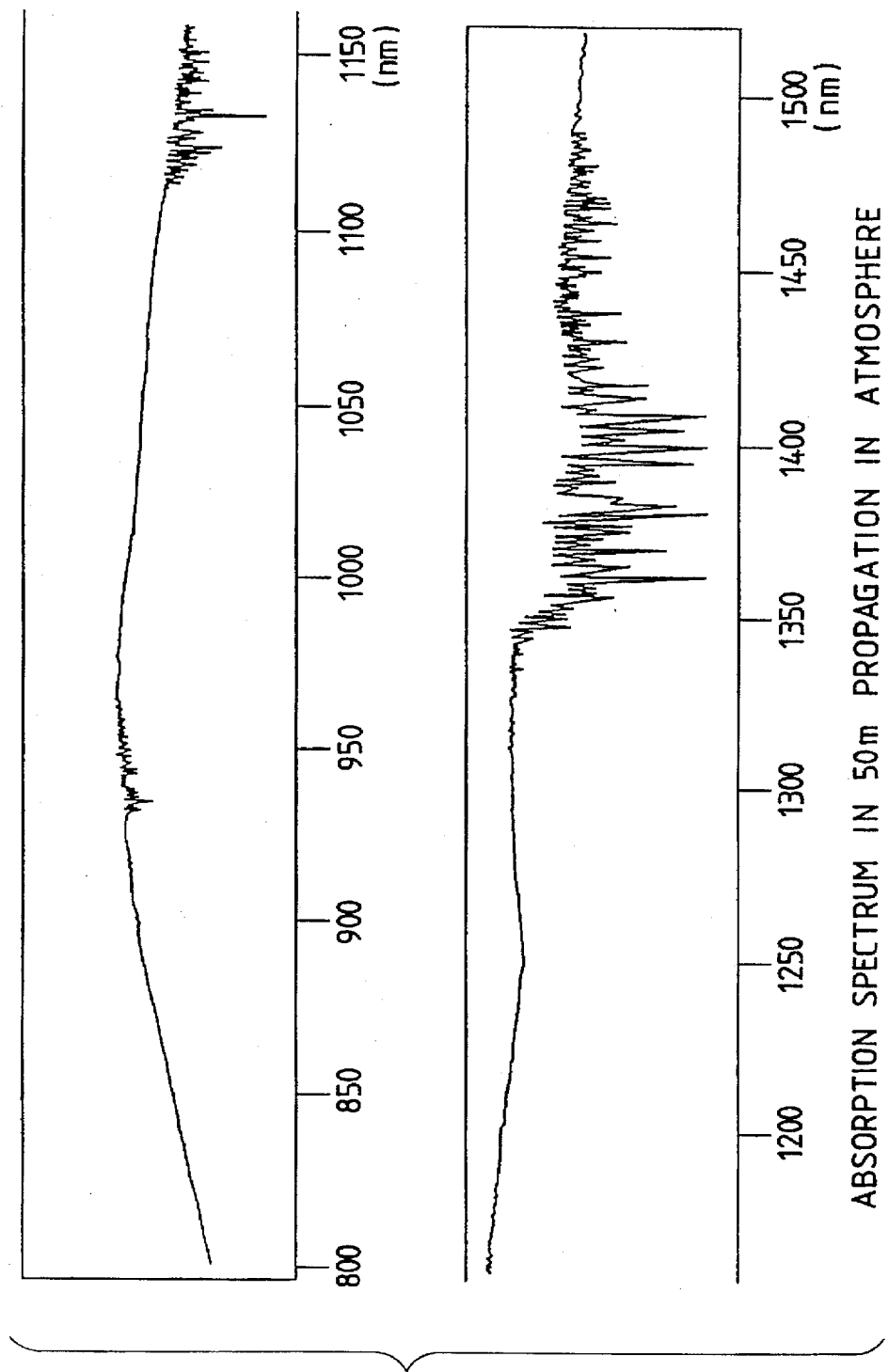
FIG. 11 is a graph to show an absorption spectrum after white light propagates 50 m over the ground.
Figure 12:
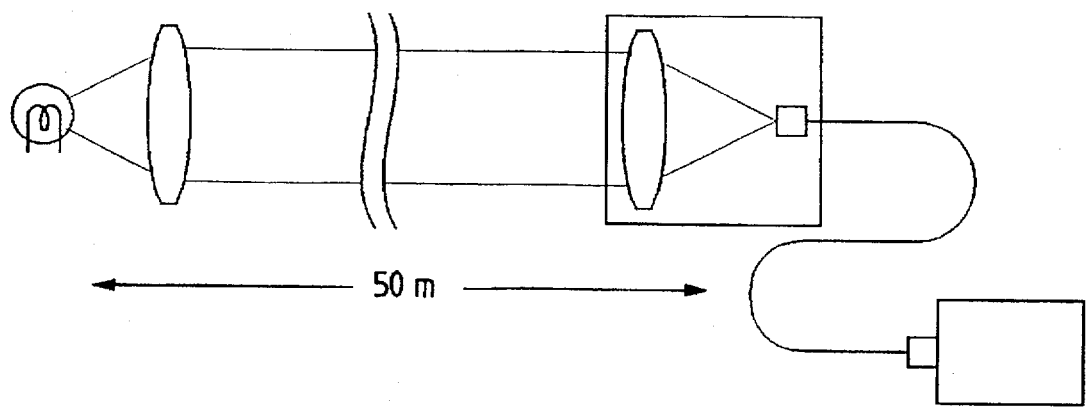
FIG. 12 is a schematic diagram to show a measurement system in measuring an absorption spectrum.

As described hereinbefore, the magnitude of attenuation due to absorption can be estimated by the scale of each spectrum shown in FIG. 11 as a graduation corresponds to about 15 dB/50 m. With the permissible attenuation amount of 6 dB, a distance in which the attenuation reaches about 6 dB after propagation of light is 20 m for a graduation in FIG. 11, 40 m for 0.5 graduation in FIG. 11, 100 m for 0.2 graduation in FIG. 11 and 200 m for 0.1 graduation in FIG. 11. An absorption spectrum with magnitude of about 0.1 graduation appears only as a notch on FIG. 11, which can hardly be discriminated from noise. However, referring also to FIG. 10, such a notch can be identified as a clear spectrum with more than 0.5 graduation on FIG. 10. Incidentally, a spectrum of 0.2 graduation on FIG. 11 corresponds to one of 1 to 1.5 graduations on FIG. 10, 0.5 graduation on FIG. 11 to about 3 graduations on FIG. 10, and one graduation on FIG. 11 to 4 to 5 graduations on FIG. 10. Here, the magnitude of absorption spectrum means a degree of drop from the reference level which is a level of intensity at a position where no absorption is observed.

Wavelength ranges usable for respective transmission distances were obtained as follows from FIG. 11 also referring to FIG. 10 as described above. The usable wavelength range is between 967 nm inclusive and 1110 nm or between 1165 nm inclusive and 1315 nm for a transmission distance of not less than 100 m, and between 986 nm inclusive and 1090 nm or between 1225 nm inclusive and 1295 nm for a transmission distance of not less than 200 m.

Since the optical space communication apparatus according to the present invention is directed to the long distance communication, the wavelength range was obtained only for transmission distance of not less than 100 m, which does not mean that all wavelengths can be used for transmission distance of less than 100 m. Although the above description used the expression "infrared region with wavelength of at least about 1 μm," there is no clear border between the infrared region and the near infrared region. It seems suitable that the spectral range is divided by absorption bands and a wavelength region without absorption between two absorption bands is treated as a group. Then the present invention covers the wavelength region above the absorption band around 950 nm. Meantime, the range above the wavelength 1400 nm is a wavelength region safe to eye, because light with wavelength in this region is absorbed by a cornea or the like, not reaching a retina. Thus, the range above wavelength 1400 nm is out of the present invention. Since it cannot be predicted when manufacturing the apparatus which distance a user actually uses, the transmission distance in the specification is a designed transmission distance of the optical space communication apparatus itself as listed in specifications or standards.

Most absorption spectra by the atmosphere are caused by water vapor and therefore the magnitude of each absorption spectrum shown in FIG. 11 differs depending upon the temperature or the humidity. The above measurement in FIG. 11 was carried out under the conditions with relatively low water vapor in the atmosphere, i.e., at temperature 24° C. and humidity 42%. Accordingly, the aforementioned wavelength bands for the respective transmission distances were determined with a margin of 1 dB to 2 dB, taking the variation into consideration.

Selecting the range of operating wavelength for each transmission distance as described, the influence of atmospheric absorption can be minimized midway in the transmission path. Also, the thus selected wavelength ranges are less affected by the attenuation due to scattering or by the noise due to background light. Therefore, the attenuation in the transmission path is lower and the disturbance noise is also lower. Even if the output from the semiconductor laser is restricted from a demand of safety, the apparatus permits the optical space communication with high reliability at long distance.

The photodetector 24 is an InGaAs avalanche photodiode (hereinafter referred to as APD) with high-speed response and multiplication effect. The photodetector may be a PIN photodiode of InGaAs, depending upon a use of the optical space communication apparatus. Either the APD or the PIN photodiode has a sufficient sensitivity (quantum efficiency) in the wavelength region of 950 nm to 1400 nm. APD or PIN photodiode of Ge may also be used in place of those of InGaAs.

The band-pass filter 23 is for removing wavelength components including the background light, other than the wavelength of signal light. Since the optical space communication apparatus is usually installed and used outdoors as described above, light from the surroundings other than the signal light will enter the photodetector 24 in the daytime. This is generally called as the background light. When the background light enters the photodetector 24, the direct-current component of photovoltaic current increases the shot noise, lowering the S/N ratio of signal. Thus, the band-pass filter 23 is set in front of the photodetector 24 in order to permit only a wavelength component of signal light to pass therethrough but to remove unnecessary wavelength components of background light. The transmission wave range of the band-pass filter 23 must be set to include the oscillation wavelength of the semiconductor laser 15 as a radiative source. Thus, the transmission range must be within either of the wavelength ranges for transmission distances as described above. The collimating lens 21 and the collecting optical system 22 used in the transmitter 11 and in the receiver 12 should of course be well designed in respect of coating and aberration to have necessary optical performance in the aforementioned wavelength ranges.

As described above, an optical space communication apparatus according to the present invention is so arranged that a light signal emitted from the semiconductor laser 15 provided in the transmitter 11 is detected by the photodetector 24 in the receiver 12, thereby performing the optical space communication. The output of light signal emitted from the transmitter 11 is controlled at a level safe to eye, and its wavelength is selected as free of the influence of absorption spectra by the atmosphere.

As described above, another optical space communication apparatus according to the present invention is so arranged that an input signal is modulated by the semiconductor laser 15 and the modulated signal is sent into the space through the collimating lens 21. Also, the temperature sensor 19 is provided in the package 14 for the semiconductor laser 15. The temperature in the package 14 can be controlled by driving the cooling device 18 by a command from the temperature control circuit 20. The reliability is improved in long distance space communication by controlling the temperature of semiconductor laser 15 such that the output from the semiconductor laser 15 is kept safe to human eye and the oscillation wavelength of semiconductor laser 15 is set in a wavelength range having no absorption spectrum due to the atmosphere.

Figure 16:
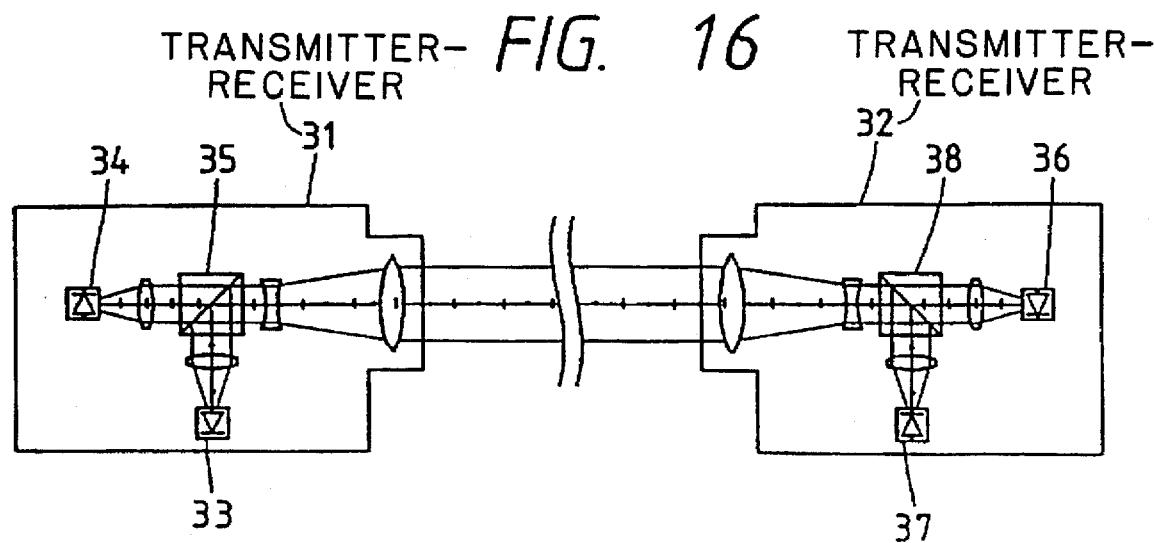
FIG. 16 is a schematic diagram to show a second embodiment.

FIG. 16 is a schematic diagram to show the second embodiment of optical space communication apparatus according to the present invention, in which two transmitter-receivers 31, 32 are opposed to each other. A semiconductor laser 33 and an APD 34 are arranged in the transmitter-receiver 31 so as to perform transmission and reception, respectively, of signal through a polarization beam splitter 35. Similarly, a semiconductor laser 36 and an APD 37 are arranged in the transmitter-receiver 32 so as to perform transmission and reception, respectively, of signal through a polarization beam splitter 38. The apparatus is so arranged that, utilizing the polarization characteristics of oscillation light of the semiconductor lasers 33, 36, a beam from the semiconductor laser 33 enters the APD 37 and a beam from the semiconductor laser 36 enters the APD 34, thus enabling two-way (bidirectional) communication.

In the optical space communication apparatus, the two transmitter-receivers 31, 32 separate transmitted light from received light by polarizations thereof different in plane of polarization 90° from each other to permit the two-way communication in the atmosphere. The transmitter-receivers 31, 32 have the polarization beam splitters 35, 38 for separating one from the other polarized light different in plane of polarization 90° from each other.

In this example, the oscillation wavelength of semiconductor lasers 33, 36 is set in either of the wavelength regions according to the transmission distances as determined in the first embodiment. The polarization beam splitters 35, 38 are designed such that the wavelength region most effective to separate P-polarized light from S-polarized light covers the oscillation wavelength of semiconductor lasers 33, 36. As so arranged, the apparatus may have a high transmission efficiency of signal in the two-way communication. The wavelength region where the polarized light can be separated with high efficiency must be within either of the wavelength ranges according to the transmission distances, as described above.

Figure 17:
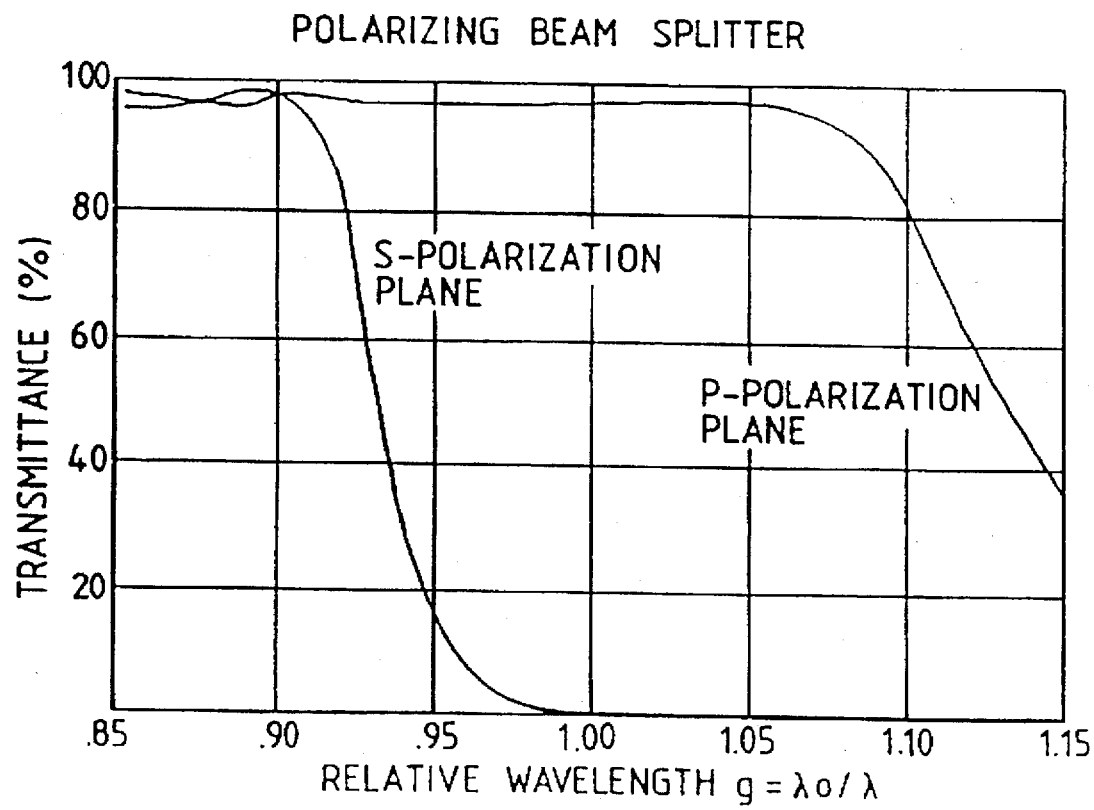
FIG. 17 is a graph to show polarization characteristics of a polarization beam splitter.

FIG. 17 is a graph to show a typical polarization characteristic of the polarization beam splitters 35, 38, in which the wavelength range where the P-polarized light can be separated with highest efficiency from S-polarized light is a wavelength range in which a relative wavelength g is between 1.00 and 1.05 both inclusive. That is, the most efficient region is the wavelength range in which the transmittance of P-polarized light is not less than 95% while the transmission of S-polarized light is not more than 5%.

As described above, the optical space communication apparatus according to the present invention can simultaneously achieve an improvement in reliability upon long distance space communication and assurance of safety to human body by the arrangement in which the output from the laser such as the semiconductor laser is controlled at a level safe to eye and the oscillation wavelength is set in the wavelength range avoiding the absorption spectra by the atmosphere to make the apparatus free of the influence of attenuation.

In the above embodiments, the wavelength ranges which can be chosen according to the transmission distance were determined with reference to FIG. 10 and FIG. 11. It must be, however, empirically confirmed how much the wavelength of a semiconductor laser employed is influenced by the absorption.

Figure 18:
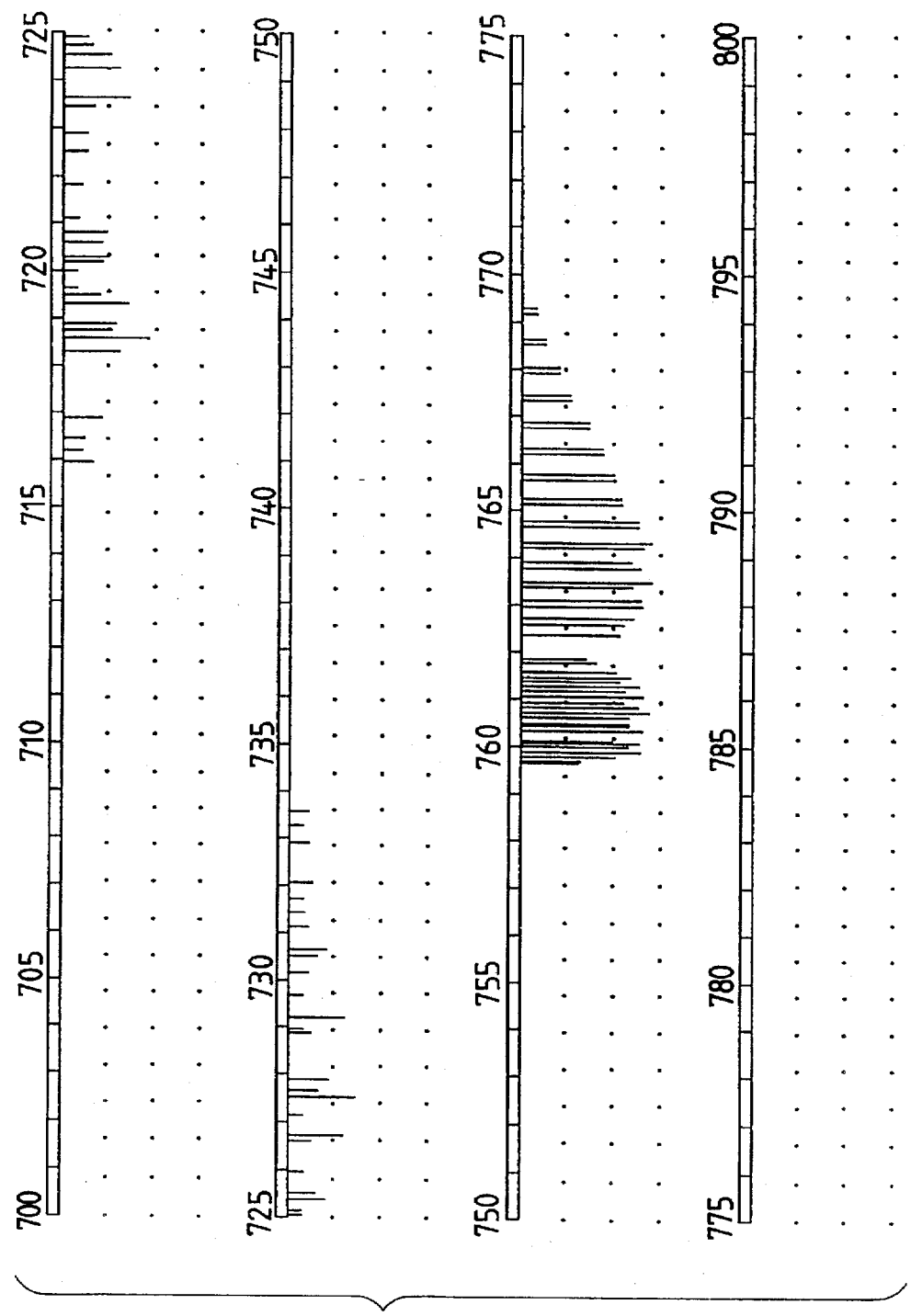
FIG. 18 is a graph to show an absorption spectrum of the atmosphere.
Figure 19:
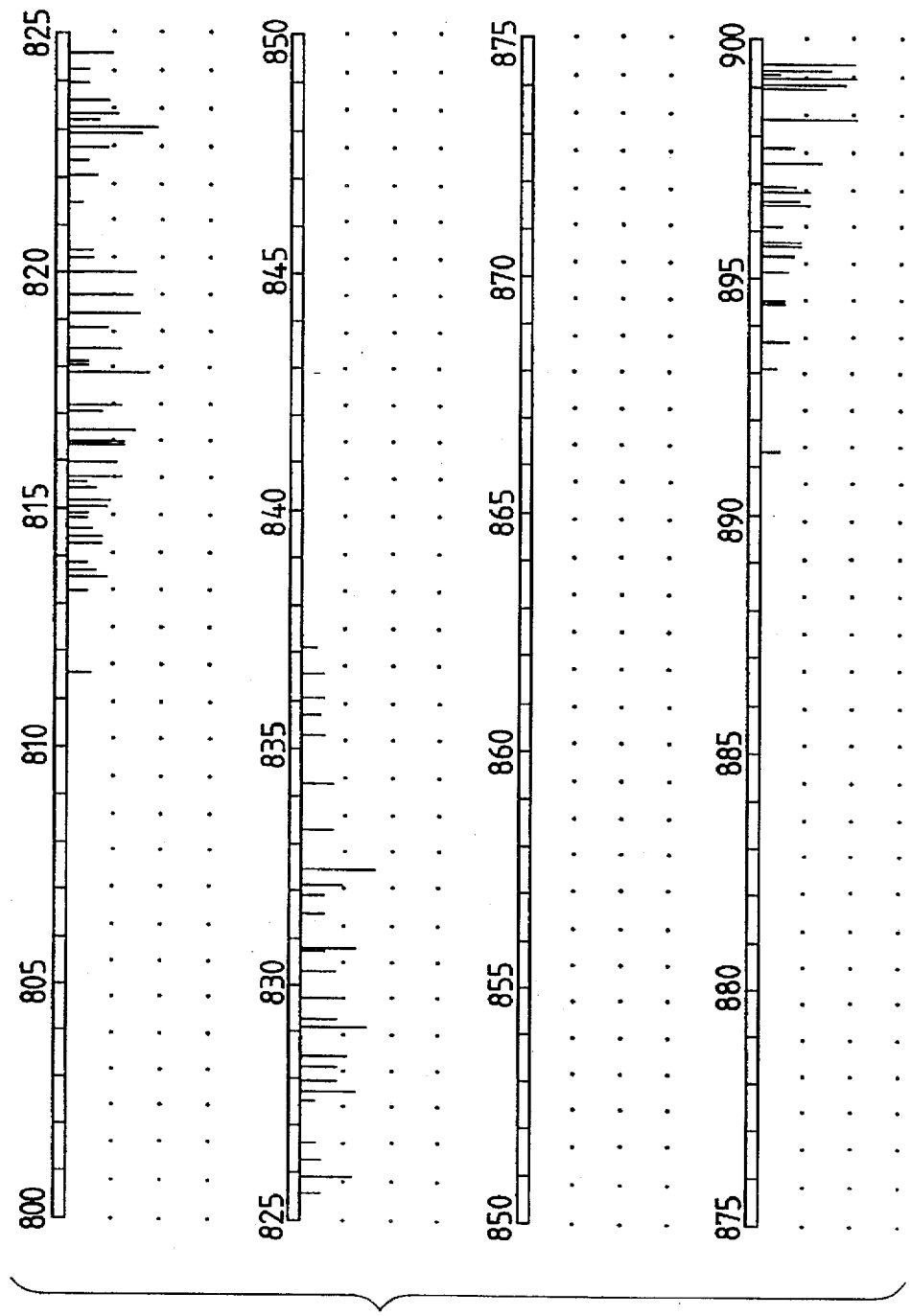
FIG. 19 is a graph to show an absorption spectrum of the atmosphere.
Figure 20:
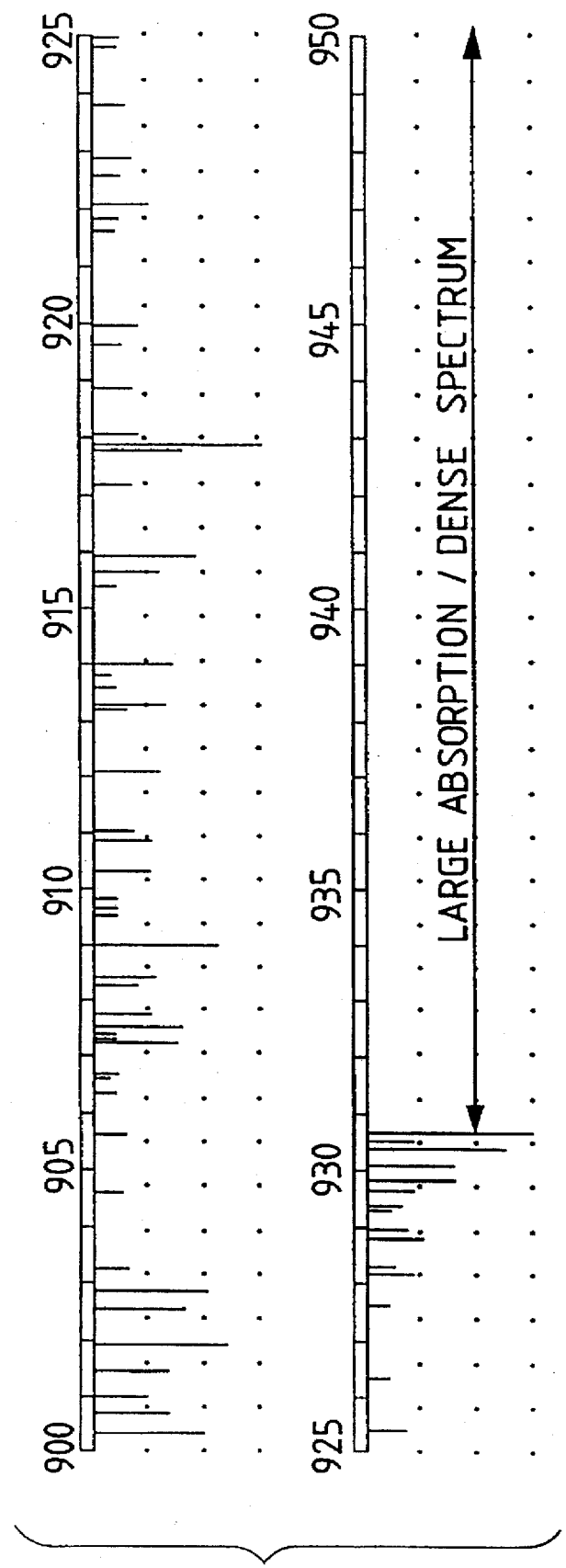
FIG. 20 is a graph to show an absorption spectrum of the atmosphere.
Figure 21:
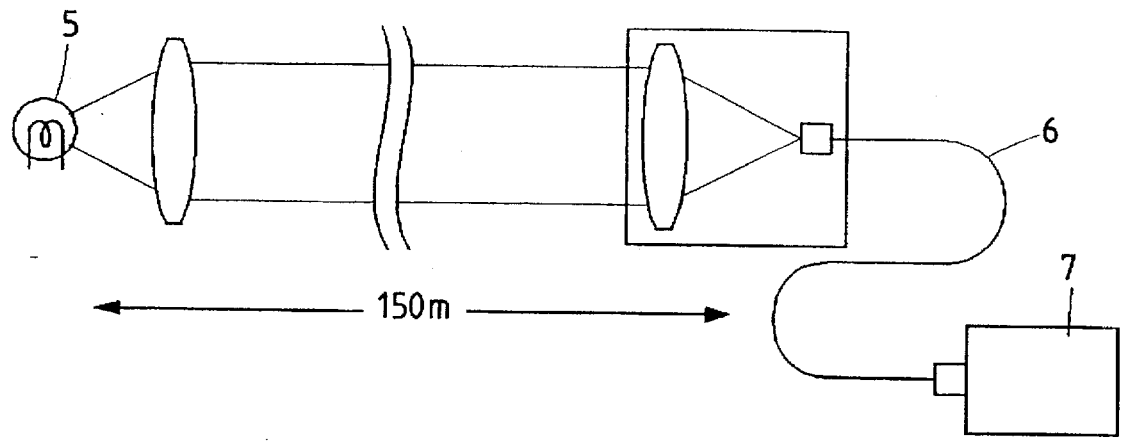
FIG. 21 is a drawing to illustrate a method of measurement by a spectrum analyzer.

The absorption spectra by the atmosphere must be measured in detail in order to seize the mechanism of atmospheric absorption for semiconductor laser oscillation beam. Then measurement was carried out not with the solar radiation as in the conventional examples but with the actual light beam. In the measurement, a light beam was made to propagate over the ground and the atmospheric absorption was accurately measured using a measuring system with high resolution. FIGS. 18 to 20 are graphs to show the measurement results of atmospheric absorption spectra obtained by Inventors. In the measurement, white light from a white light source 5 was collimated to propagate 150 m, as shown in FIG. 21, in a room kept at temperature 22° C. and humidity 38% and the spectral intensity after propagation was measured using an optical fiber 6 and an optical spectrum analyzer 7 (Advantest TQ 8345).

A spectrum has been considered heretofore as an absorption band having a certain width, while the measurement results showed that the spectrum was not a continuous absorption band but a set of numerous line spectra each having a very narrow width. Also, an accurate wavelength was measured for each line spectrum, and a rate of attenuation was also measured for each line spectrum over the ground. The measurement of attenuation was carried out as follows. Light beams from semiconductor laser were made to propagate the same distance. The oscillation wavelength of semiconductor laser was set to coincide with the wavelength of each absorption spectrum. An amount of attenuation was measured by a light power meter. The amount of attenuation was compared with a magnitude of absorption spectrum for the wavelength. It was estimated from a change in detection power in the measurement that each graduation corresponded to an attenuation amount of about 2 dB in FIG. 18 to FIG. 20.

According to the specifications of the power meter, the resolution for the measurement is at most 0.05 nm, but was at most 0.03 nm in actual measurement. A width of each absorption spectrum is about 0.06 nm. Most of the absorption spectra are considered as absorption caused by molecules of $O_2$ or $H_2O$. FIG. 18 to FIG. 20 omit the region above 930 nm, because the absorption spectra each have a large attenuation rate and are very dense in the region, which cannot be practically used.

However, since the attenuation amount due to absorption becomes greater in optical space communication at a transmission distance of at least 200 m, the semiconductor laser must be selected in the wavelength range where there is no absorption spectrum. According to FIG. 18 to FIG. 20, wavelength bands without absorption spectrum are three regions of between 735 nm inclusive and 759 nm, between 770 nm inclusive and 811 nm, and between 838 nm inclusive and 891 nm. The oscillation wavelength of semiconductor laser 15 used in the apparatus of FIG. 15 is set in either range of the three regions. Further, the oscillation frequency of semiconductor laser 15 must be so determined that the oscillation frequency will never be deviated from the selected wavelength region because of a temperature change, considering a change in wavelength in the range of temperature of operating environment. Since the wavelength region below 715 nm can be considered as in the visible light region, it is eliminated from the operating wavelength band.

It is conceivable that there are absorption spectra with low attenuation rate in the above ranges of employed oscillation wavelength, though were not detected. They can be, however, deemed as little influencing the transmission.

Since it cannot be predicted at the time of production of apparatus which distance a user actually employs, the transmission distance in this case means a transmission distance of the apparatus itself as defined in specifications or standards. Further, most of the absorption spectra in FIG. 18 to FIG. 20 are considered to be caused by water vapor. Since the measurement was carried out under the conditions with relatively low water vapor in the atmosphere, i.e., at humidity 38%, it is conceivable that the attenuation amount due to absorption further increases under the conditions with higher humidity. However, even with a large amount of attenuation exceeding those in FIG. 18 to FIG. 20, stable long distance communication is possible by using the aforementioned wavelength bands for the transmission distance of at least 200 m.

Incidentally, the output from the semiconductor laser must be controlled at a level safe to human body, as described above, even if the semiconductor laser employed has an overall range of between 735 nm inclusive and 759 nm, between 770 nm inclusive and 811 nm, or between 838 nm inclusive and 891 nm for its oscillation wavelength in the entire range of operating environment temperature for a transmission distance of at least 200 m.

In more detail, from Equation (1) as described hereinbefore, in case target workers include unspecified third persons, the irradiance is set as not more than $6.47 \cdot 10^{(L-700)/500}$ (W/m$^2$) at an arbitrary position in transmission path, where L (nm) is the wavelength.

Also, from Equation (3) as described hereinbefore, in case the target workers include only specified workers, the irradiance is set as not more than $11.5 \cdot 10^{(L-700)/500}$ (W/m$^2$) at an arbitrary position in transmission path, where L (nm) is the wavelength.

For example, if a semiconductor laser employed has the wavelength L of about 800 nm, the MPE is 10.3 W/m$^2$ from Equation (1) as described above. Also, assuming that a light beam from the semiconductor laser has a Gaussian distribution with the center portion having a strong intensity and that the diameter of collimating lens 21 is 100 nm and f-value of the lens is about 1.8 in the apparatus of FIG. 15, the output power of semiconductor laser must be not more than 15 mW in order to control the maximum irradiance of beam center at a level of at most 10.3 W/m$^2$.

Further, a permissible value of attenuation of light due to the absorption in the atmosphere depends upon the system of communication or the type of signal, and cannot be determined uniquely. It is usual that the system cannot be designed with a too large margin, that is, with too much waste from the limits for example of cost. Then an appropriate permissible value of attenuation is in the range of about 3 dB to 6 dB (which is a half to a quarter in intensity). Actually, the general light receivers are designed with minimum receiving level of about −30 dBm to −40 dBm. The output power may be controlled at about 15 mW (about 12 dBm) for the minimum receiving level, taking the safety into consideration. In that case, the receiving efficiency is about 20 dB to 23 dB with a loss on the way due to divergence and eccentricity of beam, a loss due to the scattering by rain or fog is at most about 16 dB, which is an addition of a limit of 13 dB and a margin of 3 dB, and a level drop due to scintillation change is 3 dB to 6 dB. A light power at the receiving point calculated from the above values is about 27 dBm to 33 dBm. It is, therefore, seen that an appropriate permissible amount of attenuation due to only the absorption is about 3 dB to 6 dB. In this example, the permissible amount of attenuation is considered as 6 dB.

Also, if a semiconductor laser employed has the wavelength L of about 800 nm, the MPE is 18.3 W/m$^2$ from Equation (3) as described above. Then, assuming that a light beam from the semiconductor laser has a Gaussian distribution with the center portion having a strong intensity and that the diameter of collimating lens 21 is 100 nm and f-value of the lens is about 1.8 in the apparatus of FIG. 15, the output power of semiconductor laser must be not more than 26.6 mW in order to control the maximum irradiance of beam center at a level of at most 18.3 W/m$^2$.

Further, a permissible value of attenuation of light due to the absorption in the atmosphere depends upon the system of communication or the type of signal, and cannot be determined uniquely. It is usual that the system cannot be designed with a too large margin, that is, with too much waste from the limits for example of cost. Then an appropriate permissible value of attenuation is in the range of about 3 dB to 6 dB (which is a half to a quarter in intensity). Actually, the general light receivers are designed with minimum receiving level of about −30 dBm to −40 dBm. The output power may be controlled at about 26 mW (about 14 dBm) for the minimum receiving level, taking the safety into consideration. In that case, the receiving efficiency is about 20 dB to 23 dB with a loss on the way due to divergence and eccentricity of beam, a loss due to the scattering by rain or fog is at most about 16 dB, which is an addition of a limit of 13 dB and a margin of 3 dB, and a level drop due to scintillation change is 3 dB to 6 dB. A light power at the receiving point calculated from the above values is about −25 dBm to −31 dBm. It is, therefore, seen that an appropriate permissible amount of attenuation due to only the absorption is about 3 dB to 6 dB. In this example, the permissible amount of attenuation is considered as 6 dB.

In FIG. 18 to FIG. 20, most of spectral lines have an amount of attenuation of at most about 4 dB for 150 m and their attenuation reaches 6 dB in a distance of less than 200 m. Although some of spectra show large attenuation, the provability that the wavelength of semiconductor laser is included in either of the spectra is low. Accordingly, in case a semiconductor laser is used with wavelength in the range of 700 nm to 900 nm, the apparatus of FIG. 15 can be well operated free of serious influence as long as the transmission distance used in communication is less than 200 m, for example even if the output power of semiconductor laser 15 is kept below the safety standard and even if the oscillation beam of semiconductor laser 15 is attenuated by absorption of the atmosphere.

Also, using the semiconductor laser with the overall region of oscillation wavelength in the entire range of operating environmental temperature being between 735 nm inclusive and 759 nm, between 770 nm inclusive and 811 nm, or between 838 nm inclusive and 891 nm for the transmission distance of at least 200 m, as described above, the apparatus as described above with FIG. 15 to FIG. 17 can be also used.

In more detail, a light beam emitted from the semiconductor laser 15 set in the transmitter 11 is detected by the photodetector 24 in the receiver 12, whereby the optical space communication can be achieved using the near infrared light. In such near infrared optical space communication apparatus, the long distance communication can be made with high reliability while assuring the safety to human body, if the output of semiconductor laser 15 is controlled at a level safe to human eye and if the employed semiconductor laser 15 has the overall region of oscillation wavelength in the operating environment temperature range falling between 735 nm inclusive and 759 nm, between 770 nm inclusive and 811 nm, or between 838 nm inclusive and 891 nm.

The above-described embodiments avoided the influence of attenuation by setting the oscillation wavelength of semiconductor laser in a wavelength range excluding the absorption spectra by the atmosphere.

In FIG. 18 to FIG. 20 as described, the intensity of absorption spectra is not constant and therefore it is wasteful to avoid all absorption spectra independent of the distance employed. Then, if absorption spectra to be avoided are to be selected depending upon the intensity of absorption and the operation distance, the control would be simple and the degree of freedom would increase for setting of operation region of the semiconductor laser 15 in the apparatus of FIG. 15 and for selection of semiconductor laser.

In FIG. 18 to FIG. 20, the length of each spectral line represents the magnitude of absorption, and a graduation corresponds to an attenuation amount of about 2 dB for measurement distance of 150 m, as described before. A permissible attenuation amount in transmission path depends upon the type of signal and the use in addition to the S/N ratio required for signal, and therefore cannot be determined uniquely. Since the system cannot usually be designed with a too large margin or with too much waste from the restriction for example of cost, an appropriate permissible amount of attenuation is about 3 dB to 6 dB (which is a half to a quarter in intensity).

Here, let us consider that the permissible amount of attenuation is 6 dB. The absorption spectra can be classified into the following first to twelfth spectral series in respect of wavelength band and intensity.

First spectral series:
716.94 nm, 718.36 nm, 718.66 nm, 718.83 nm, 718.93 nm, 719.36 nm, 719.55 nm, 720.25 nm, 720.33 nm, 720.63 nm, 720.86 nm, 723.67 nm, 724.28 nm, 724.58 nm, 725.44 nm, 726.76 nm, 727.56 nm, 727.94 nm, 729.24 nm, 730.66 nm Second spectral series:
715.99 nm, 716.49 nm, 716.54 nm, 722.56 nm, 722.94 nm, 723.49 nm, 724.78 nm, 724.94 nm, 725.57 nm, 726.66 nm, 727.71 nm, 728.91 nm, 730.53 nm, 732.08 nm Third spectral series:
716.27 nm, 719.70 nm, 720.05 nm, 721.16 nm, 721.86 nm, 725.09 nm, 725.21 nm, 726.00 nm, 727.20 nm, 728.99 nm, 729.71 nm, 730.19 nm, 731.15 nm, 731.45 nm, 731.76 nm, 732.93 nm, 733.29 nm, 733.58 nm Fourth spectral series:
759.61 nm, 759.66 nm, 759.73 nm, 759.84 nm, 759.97 nm, 760.03 nm, 760.08 nm, 760.28 nm, 760.39 nm, 760.44 nm, 760.57 nm, 760.66 nm, 760.78 nm, 760.89 nm, 761.00 nm, 761.14 nm, 761.25 nm, 761.34 nm, 761.42 nm, 761.53 nm, 761.73 nm, 761.84 nm, 762.32 nm, 762.54 nm, 762.66 nm, 762.91 nm, 763.05 nm, 763.32 nm, 763.44 nm, 763.72 nm, 763.86 nm, 764.17 nm, 764.28 nm, 764.62 nm, 764.73 nm, 765.10 nm, 765.21 nm, 765.61 nm, 765.72 nm, 766.15 nm, 766.26 nm, 766.71 nm, 766.80 nm, 767.28 nm, 767.39 nm, 767.88 nm, 767.97 nm Fifth spectral series:
768.47 nm, 768.59 nm Sixth spectral series:
769.13 nm, 769.22 nm Seventh spectral series:
813.60 nm, 815.07 nm, 815.20 nm, 815.71 nm, 816.03 nm, 816.38 nm, 816.45 nm, 816.67 nm, 817.22 nm, 817.93 nm, 818.41 nm, 818.87 nm, 819.16 nm, 819.55 nm, 820.00 nm, 822.63 nm, 822.93 nm, 823.06 nm, 823.35 nm, 823.61 nm, 824.58 nm, 825.88 nm, 827.66 nm, 827.89 nm, 828.18 nm, 828.42 nm, 829.04 nm, 829.18 nm, 829.64 nm, 830.24 nm, 830.74 nm, 832.04 nm, 832.37 nm Eighth spectral series:
811.59 nm, 813.73 nm, 814.30 nm, 814.43 nm, 814.62 nm, 815.49 nm, 817.09 nm, 820.29 nm, 820.46 nm, 822.05 nm, 823.22 nm, 830.67 nm, 831.44 nm, 831.84 nm, 833.21 nm, 834.15 nm, 835.15 nm, 835.93 nm, 836.43 nm Ninth spectral series:
813.28 nm, 813.89 nm, 814.85 nm, 814.94 nm, 815.61 nm, 818.06 nm, 818.16 nm, 821.46 nm, 822.37 nm, 823.97 nm, 824.24 nm, 825.52 nm, 826.21 nm, 826.57 nm, 827.46 nm, 835.59 nm, 836.97 nm Tenth spectral series:
895.67 nm, 895.75 nm, 896.52 nm, 896.60 nm, 896.79 nm, 897.41 nm, 898.31 nm, 898.93 nm, 899.01 nm, 899.31 nm, 899.44 nm, 900.29 nm, 900.65 nm, 901.00 nm, 901.43 nm, 901.94 nm, 902.53 nm, 902.84 nm, 907.19 nm, 907.47 nm, 907.70 nm, 908.22 nm, 908.33 nm, 908.98 nm, 910.25 nm, 910.81 nm, 912.05 nm, 913.22 nm, 913.90 nm, 915.55 nm, 915.84 nm, 917.66 nm, 917.74 nm, 917.94 nm, 919.82 nm, 921.99 nm, 928.13 nm, 928.75 nm, 929.59 nm, 929.80 nm, 930.05 nm Eleventh spectral series:
893.66 nm, 894.47 nm, 894.53 nm, 895.13 nm, 895.46 nm, 896.91 nm, 897.72 nm, 899.16 nm, 903.20 nm, 904.54 nm, 905.56 nm, 910.97 nm, 913.14 nm, 917.05 nm, 918.72 nm, 919.49 nm, 921.74 nm, 922.48 nm, 922.75 nm, 923.75 nm, 924.95 nm, 925.36 nm, 928.26 nm, 928.92 nm, 929.34 nm Twelfth spectral series:
891.36 nm, 893.12 nm, 896.09 nm, 899.24 nm, 906.31 nm, 906.55 nm, 906.63 nm, 907.26 nm, 907.34 nm, 909.49 nm, 909.61 nm, 909.77 nm, 913.50 nm, 913.70 nm, 915.27 nm, 921.53 nm, 924.78 nm, 926.31 nm, 927.59 nm, 929.25 nm In summary, absorption spectra in which the transmission distance is at least 800 m when the attenuation amount exceeds 6 dB, are listed in the third, the sixth, the ninth and the twelfth spectral series; absorption spectra in which the transmission distance is at least 400 m thereupon, in the second, the fifth, the eighth and the eleventh spectral series; and absorption spectra in which the distance is at least 200 m thereupon, in the first, the fourth, the seventh and the tenth spectral series. Since the magnitude of absorption differs depending upon the measurement conditions such as the temperature or the humidity, a margin of about 1.5 dB to 2 dB is given.

Further, the first, the second and the third spectral series indicate the absorption spectra in the wavelength band of between 715 nm inclusive and 735 nm, the fourth, the fifth and the sixth spectral series the absorption spectra in the wavelength band of between 759 nm inclusive and 770 nm, the seventh, the eighth and the ninth spectral series the absorption spectra in the wavelength band of between 811 nm inclusive and 838 nm, and the tenth, the eleventh and the twelfth spectral series the absorption spectra in the wavelength band of between 891 nm inclusive and 930 nm.

Accordingly, the temperature of semiconductor laser 15 in the apparatus of FIG. 15 is controlled such that in case the transmission distance is between 200 m inclusive and 400 m the absorption spectra in the first, the fourth, the seventh and the tenth spectral series are avoided, in case the transmission distance is between 400 m inclusive and 800 m the absorption spectra in the second, the fifth, the eighth and the eleventh spectral series are avoided, and in case the transmission distance is not less than 800 m the absorption spectra in the third, the sixth, the ninth and the twelfth spectral series are avoided. In the above list, each numerical value may include an error of about ±0.03 nm because of the limit of resolution in measurement and each absorption spectrum has a width of about 0.06 nm. Therefore, the oscillation wavelength of semiconductor laser 15 must be controlled out of the region of ±0.06 nm for each value shown in the above list.

Meantime, FIG. 18 to FIG. 20 omit the region of wavelength of not less than 930 nm, in which large absorption spectra are aggregated densely and stable transmission seems impossible even with the above-described means. Therefore, the region is excluded from the region of operating wavelength.

Since it cannot be predicted which distance a user employs in the apparatus, in case of the apparatus being produced under an assumption that it is used for a transmission distance of not less than 800 m as defined in specifications or standards for example, the absorption spectra for the transmission distance can be well avoided. As described, the oscillation wavelength of semiconductor laser 15 is controlled as to avoid the attenuation due to the absorption spectra, whereby long distance communication can be made with high reliability.

Meantime, when a semiconductor laser employed has the oscillation wavelength in the range of between 715 nm inclusive and 735 nm, between 759 nm inclusive and 770 nm, between 811 nm inclusive and 838 nm, or between 891 nm inclusive and 930 nm, the output from the semiconductor laser must also be controlled at a level safe to human body, as described above.

In more detail, from Equation (1) as described above, if the target workers include unspecified third persons, the irradiance is set as not more than $6.47 \cdot 10^{(L-700)/500}$ (W/m$^2$) at an arbitrary position in transmission path, where L (nm) is the wavelength.

Also, from Equation (3) as described above, if the target workers include only specified workers, the irradiance is set as not more than $11.5 \cdot 10^{(L-700)/500}$ (W/m$^2$) at an arbitrary position in transmission path, where L (nm) is the wavelength.

For example, if a semiconductor laser employed has the wavelength L of about 820 nm, the MPE is 11.2 W/m$^2$ from Equation (1) as described above. Also, assuming that a light beam from the semiconductor laser has a Gaussian distribution with the center portion having a strong intensity and that the diameter of collimating lens 21 is 100 mm and f-value of the lens is about 1.8 in the apparatus of FIG. 15, the output power of semiconductor laser must be not more than 16 mW in order to control the maximum irradiance of beam center at a level of at most 11.2 W/m$^2$.

Actually, the general light receivers are designed with minimum receiving level of about −30 dBm to −40 dBm. The output power may be controlled at about 15 mW (about 12 dBm) for the minimum receiving level, taking the safety into consideration. In that case, the receiving efficiency is about 20 dB to 23 dB with a on the way due to divergence and eccentricity of beam, a loss due to the scattering by rain or fog is at most about 16 dB, which is an addition of a limit of 13 dB and a margin of 3 dB, and a level drop due to scintillation change is 3 dB to 6 dB. A light power at the receiving point calculated from the above values is about 27 dBm to 33 dBm. It is, therefore, seen that an appropriate permissible amount of attenuation due to only the absorption is about 3 dB to 6 dB. In this example, the permissible amount of attenuation is considered as 6 dB.

Also, if a semiconductor laser employed has the wavelength L of about 830 nm, the MPE is 19.9 W/m$^2$ from Equation (3) as described above. Also, assuming that a light beam from the semiconductor laser has a Gaussian distribution with the center portion having a strong intensity and that the diameter of collimating lens 21 is 100 mm and f-value of the lens is about 1.8 in the apparatus of FIG. 15, the output power of semiconductor laser must be not more than 29 mW in order to control the maximum irradiance of beam center at a level of at most 19.9 W/m$^2$.

Actually, the general light receivers are designed with minimum receiving level of about −30 dBm to −40 dBm. The output power may be controlled at about 26 mW (about 14 dBm) for the minimum receiving level, taking the safety into consideration. In that case, the receiving efficiency is about 20 dB to 23 dB with a loss on the way due to divergence and eccentricity of beam, a loss due to the scattering by rain or fog is at most about 16 dB, which is an addition of a limit of 13 dB and a margin of 3 dB, and a level drop due to scintillation change is 3 dB to 6 dB. A light power at the receiving point calculated from the above values is about −25 dBm to −31 dBm. It is, therefore, seen that an appropriate permissible amount of attenuation due to only the absorption is about 3 dB to 6 dB. In this example, the permissible amount of attenuation is considered as 6 dB.

Also, when a semiconductor laser employed has the oscillation wavelength of between 715 nm inclusive and 735 nm, between 759 nm inclusive and 770 nm, between 811 nm inclusive and 838 nm, or between 891 nm inclusive and 930 nm as described above, the apparatus described above with FIG. 15 to FIG. 17 can be similarly used.

With the apparatus shown in FIG. 15, the oscillation wavelength spectrum of semiconductor laser 15 can be prevented as follows from being included in the absorption spectra. Keeping the output power of semiconductor laser 15 at a desired value by the output control circuit 17, the oscillation wavelength characteristic of semiconductor laser 15 is preliminarily measured against the temperature. Based on the data, the temperature of semiconductor laser 15 is controlled such that the oscillation wavelength spectrum of semiconductor laser 15 drops in a region without absorption between two absorption spectra.

Figure 13:
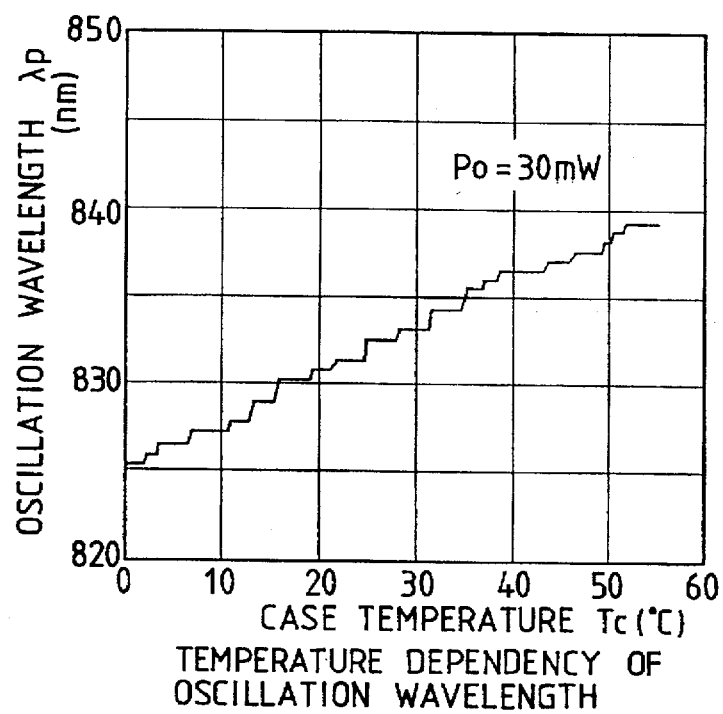
FIG. 13 is a temperature characteristic diagram of oscillation wavelength of semiconductor laser.
Figure 14:
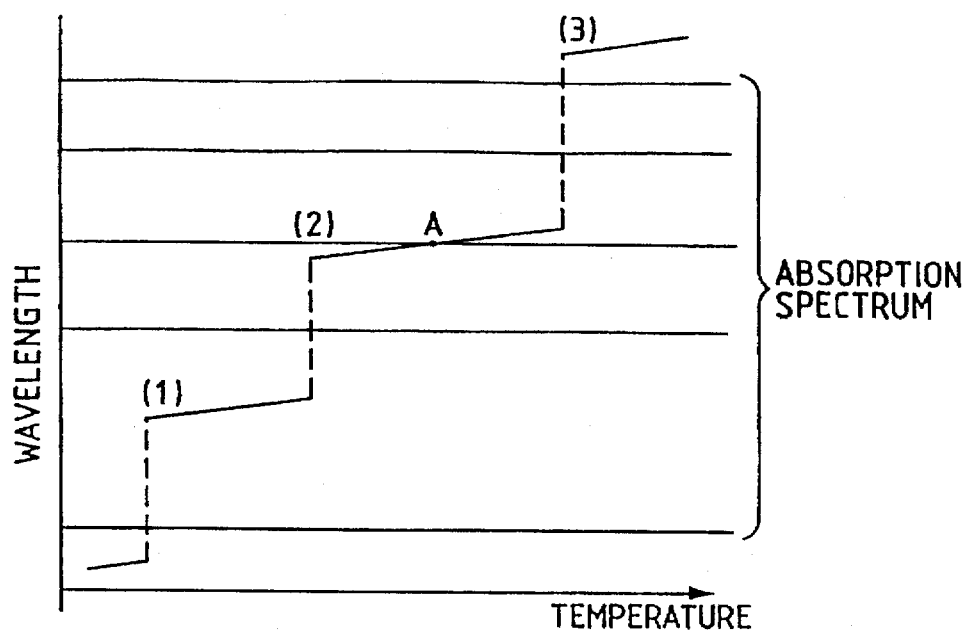
FIG. 14 is a temperature characteristic diagram of oscillation wavelength of semiconductor laser.

For example, in case of use of the semiconductor laser having the characteristics shown in FIG. 14, the temperature is controlled such that the semiconductor laser 15 operates in a step of region (2) or region (3), avoiding the step of region (1) where the oscillation wavelength spectrum of semiconductor laser 15 could be included in an absorption spectrum at the operating point A. The accuracy necessary for the temperature control is approximately 2° to 3° C., which is a temperature change corresponding to a step, as seen from FIG. 13. Such temperature control can be readily achieved.

Figure 22:
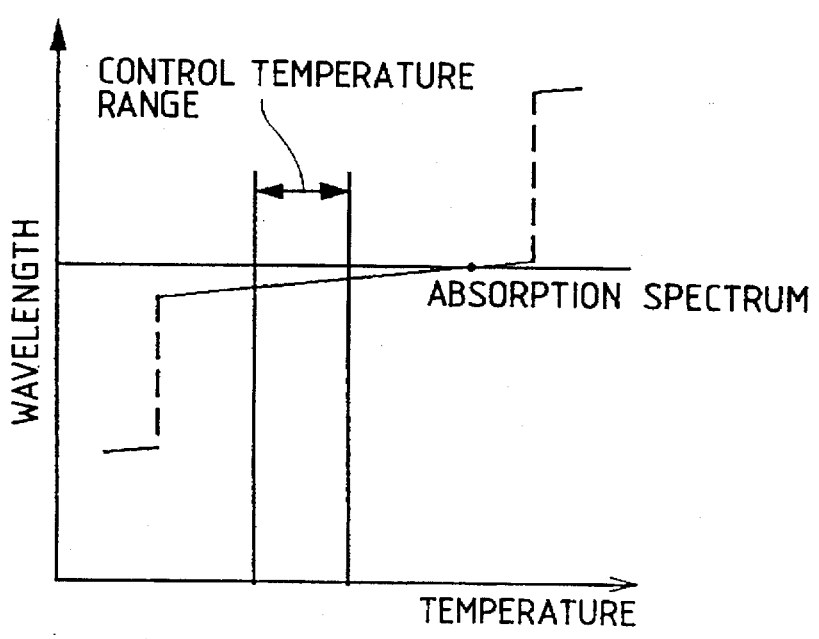
FIG. 22 is a drawing to illustrate a range of operating temperature of semiconductor laser.
Figure 23:
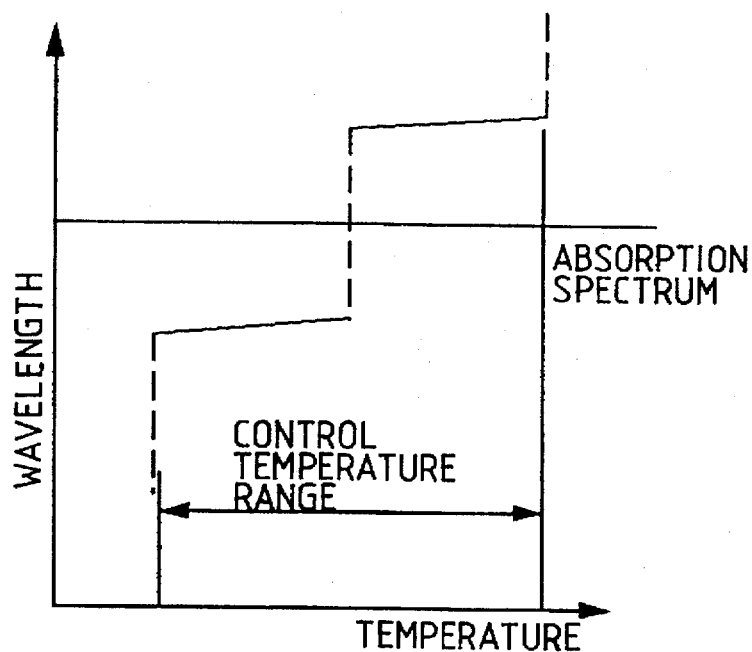
FIG. 23 is a drawing to illustrate a range of operating temperature of semiconductor laser.

Even if the oscillation wavelength spectrum of semiconductor laser 15 is on a step which could include an absorption spectrum, as shown in FIG. 22, and if the absorption spectrum can be well avoided by the above temperature control within about 2° to 3° C., the semiconductor laser 15 can be operated on the step. Further, if an absorption spectrum is located between two steps in the temperature characteristic curve without spreading on a step, as shown in FIG. 23, the semiconductor laser may be operated in the region including two or more steps.

In the above-described embodiments, the control of oscillation wavelength of semiconductor laser 15 is effected by controlling the temperature of package or chip of semiconductor laser 15 to keep constant the output power of the semiconductor laser 15.

Figure 24:
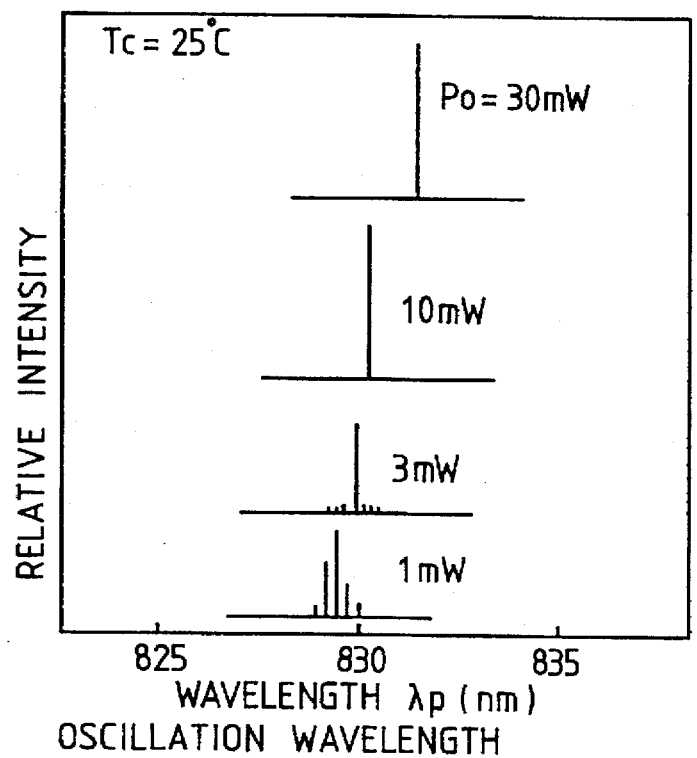
FIG. 24 is a drawing to illustrate a relation between direct current and oscillation effect of semiconductor laser.

Although in the above-described embodiments the temperature conditions were set such that the oscillation wavelength of semiconductor laser 15 was not included in an absorption spectrum while keeping constant the output power of semiconductor laser 15, the oscillation wavelength can be controlled by changing the output power with a change in forward direct current of semiconductor laser 15 while keeping constant the temperature of semiconductor laser 15 in another embodiment, because the oscillation wavelength of semiconductor laser 15 also depends upon the output power, as shown in FIG. 24. In this case, the oscillation wavelength is preliminarily measured against current while keeping the temperature of semiconductor laser constant.

In another embodiment, the control of oscillation wavelength of semiconductor laser 15 is effected by controlling the forward direct current or the output power of semiconductor laser 15 while keeping constant the temperature of package or chip of semiconductor laser 15.

If the temperature is kept constant, the output power of semiconductor laser 15 almost depends upon the forward current, and therefore the power is kept unchanged if the current is constant. In the another embodiment, the output control circuit 17 as in the above embodiments is omitted and a variable constant current source is provided instead accordingly. The temperature control circuit 20 compares a signal from temperature sensor 19 with the reference signal and controls the cooling device 18 to keep the temperature constant at the set temperature. Then the constant-current source outputs in that state such a current that the oscillation wavelength spectrum is not included in an absorption spectrum, so as to control the semiconductor laser 15. The output monitoring photodiode 16 is for obtaining a monitoring signal controlling a drive current of the variable constant-current source to keep the output from the semiconductor laser 15 at a level safe to eye. The another embodiment has a smaller range to control the oscillation wavelength than the above-described embodiments but has an advantage of the overall structure being simplified.

As detailed above, the optical space communication apparatus according to the present invention is improved in reliability in long distance space communication and keeps the safety to human body by controlling the output of laser at a level safe to human eye and setting the oscillation wavelength of laser in the wavelength region without absorption spectrum by the atmosphere in use of a laser such as the semiconductor laser as a radiative source.

What is claimed is:

1. An optical space communication method for communication with a laser as radiative source and with a light signal therefrom propagating in the atmosphere, comprising a step of performing communication under the following conditions:

in a case where a transmission distance of optical space communication is between 100 m inclusive and 200 m, said laser is a laser with an oscillation wavelength L (nm) in a wavelength range of between 967 nm inclusive and 1110 nm or in a wavelength range of between 1165 nm inclusive and 1315 nm, whereas in a case where said transmission distance is at least 200 m, said laser is a laser with an oscillation wavelength L (nm) in wavelength range of between 986 nm inclusive and 1090 nm or in a wavelength range of between 1225 nm inclusive and 1295 nm; and at any position in a transmission path between a transmitter exit and a receiver entrance, an irradiance is set to at most $6.47 \cdot 10^{(L-700)/500}$ (W/m$^2$) where the oscillation wavelength L (nm) of said laser is in a wavelength range of 950 nm to 1050 nm while to at most 32.3 (W/m$^2$) where the oscillation wavelength L is in a wavelength range of 1050 nm to 1400 nm.

2. An optical space communication method for communication with a laser as a radioactive source and with a light signal therefrom propagating in the atmosphere, comprising a step of performing communication under the following conditions:

in a case where a transmission distance of optical space communication is between 100 m inclusive and 200 m, said laser is a laser with an oscillation wavelength L (nm) in a wavelength range of between 967 nm inclusive and 1110 nm or in a wavelength range of between 1165 nm inclusive and 1315 nm, whereas in a case where said transmission distance is at least 200 m, said laser is a laser with an oscillation wavelength L (nm) in a wavelength range of between 986 nm inclusive and 1090 nm or in a wavelength range of between 1225 nm inclusive and 1295 nm; and at any position in a transmission path between a transmitter exit and receiver entrance, an irradiance is set to at most $11.5 \cdot 10^{(L-700)/500}$ (W/m$^2$) where the oscillation wavelength L (nm) of said laser is in a wavelength range of 950 nm to 1050 nm while to at most 57.5 (W/m$^2$) where the oscillation wavelength L is in a wavelength range of 1050 nm to 1400 nm.

3. An optical space communication method for communication with a laser as a radiative source and with a light signal therefrom propagating in the atmosphere, comprising a step of performing communication under the following conditions:

in a case where a transmission distance of optical space communication is at least 200 m, an irradiance at an arbitrary position in a transmission path is set to at most $6.47 \cdot 10^{(L-700)/500}$ (W/m$^2$) where L (nm) is a wavelength; and the laser has an overall region of oscillation wavelength which is included in a range of between 735 nm inclusive and 759 nm, between 770 nm inclusive and 811 nm, or between 838 nm inclusive and 891 nm.

4. An optical space communication method for communication with a laser as a radiative source and with a light signal therefrom propagating in the atmosphere, comprising a step of performing communication under the following conditions:

in a case where a transmission distance of optical space communication is at least 200 m, an irradiance at an arbitrary position in a transmission path is set to at most $11.5 \cdot 10^{(L-700)/500}$ (W/m$^2$) where h (nm) is a wavelength; and in an entire range of operating environment temperature of the laser, the laser has an overall region of oscillation wavelength which is included in a range of between 735 nm inclusive and 759 nm, between 770 nm inclusive and 811 nm, or between 838 nm inclusive and 891 nm.

5. An optical space communication method for communication with a laser as a radiative source and with a light signal therefrom propagating in the atmosphere, comprising a step of performing communication under the following conditions:

the laser oscillates with an oscillation wavelength L in a range of between 715 nm inclusive and 735 nm in a single longitudinal mode or in a mode approximate thereto;

an output power of said laser is controlled such that an irradiance of said laser does not exceed $6.47 \cdot 10^{(L-700)/500}$ (W/m$^2$) in all regions in a transmission path between a transmitting portion and a receiving portion; and the oscillation wavelength of the laser is so controlled as to be outside the ranges for a central value of each wavelength with a width of ±0.06 nm determined as follows: for a transmission distance of optical space communication between 200 m inclusive and 400 m, a first absorption spectral series comprising 716.94 nm, 718.36 nm, 718.66 nm, 718.83 nm, 718.93 nm, 719.36 nm, 719.55 nm, 720.25 nm, 720.33 nm, 720.63 nm, 720.86 nm, 723.67 nm, 724.28 nm, 724.58 nm, 725.44 nm, 726.76 nm, 727.56 nm, 727.94 nm, 729.24 nm, 730.66 nm; for a transmission distance between 400 m inclusive and 800 m, said first absorption spectral series and a second absorption spectral series comprising 715.99 nm, 716.49 nm, 716.54 nm, 722.56 nm, 722.94 nm, 723.49 nm, 724.78 nm, 724.94 nm, 725.57 nm, 726.66 nm, 727.71 nm, 728.91 nm, 730.53 nm, 732.08 nm; for a transmission distance of at least 800 m, said first and second absorption spectral series and a third absorption spectral series comprising 716.27 nm, 719.70 nm, 720.05 nm, 721.16 nm, 721.86 nm, 725.09 nm, 725.21 nm, 726.00 nm, 727.20 nm, 728.99 nm, 729.71 nm, 730.19 nm, 731.15 nm, 731.45 nm, 731.76 nm, 723.93 nm, 733.29 nm, 733.58 nm.

6. An optical space communication method for communication with a laser as a radiative source and with a light signal therefrom propagating in the atmosphere, comprising a step of performing communication under the following conditions:

the laser oscillates with a oscillation wavelength L in a range of between 759 nm inclusive and 770 nm in a single longitudinal mode or in a mode approximate thereto;

an output power of said laser is controlled such that an irradiance of said laser does not exceed $6.47 \cdot 10^{(L-700)/500}$ (W/m$^2$) in all regions in a transmission path between a transmitting portion and a receiving portion; and the oscillation wavelength of the laser is so controlled as to be outside the ranges of a central value of each wavelength with a width of −0.06 nm determined as follows: for a transmission distance of optical space communication between 200 m inclusive and 400 m, a fourth absorption spectral series comprising 759.61 nm, 759.66 nm, 759.73 nm, 759.84 nm, 759.97 nm, 760.03 nm, 760.08 nm, 760.28 nm, 760.39 nm, 760.44 nm, 760.57 nm, 760.66 nm, 760.78 nm, 760.89 nm, 761.00 nm, 761.14 nm, 761.25 nm, 761.34 nm, 761.42 nm, 761.53 nm, 761.73 nm, 761.84 nm, 762.32 nm, 762.54 nm, 762.66 nm, 762.91 nm, 763.05 nm, 763.32 nm, 763.44 nm, 763.72 nm, 763.86 nm, 764.17 nm, 764.28 nm, 764.62 nm, 764.73 nm, 765 10 nm, 765 21 nm, 765.61 nm, 765.72 nm, 766.15 nm, 766.26 nm, 766.71 nm, 766.80 nm, 767.28 nm, 767.39 nm, 767.88 nm, 767.97 nm; for a transmission distance between 400 m inclusive and 800 m, said fourth absorption spectral series and a fifth absorption spectral series comprising 768.47 nm and 768.59 nm; for a transmission distance of at least 800 m, the fourth and fifth absorption spectral series and a sixth absorption spectral series comprising 769.13 nm and 769.22 nm.

7. An optical space communication method for communication with a laser as a radiative source and with a light signal therefrom propagating in the atmosphere, comprising a step of performing communication under the following conditions:

the laser oscillates with a oscillation wavelength L in a range of between 811 nm inclusive and 838 nm in a single longitudinal mode or in a mode approximate thereto;

an output power of said laser is controlled such that an irradiance of said laser does not exceed $6.47 \cdot 10^{(L-700)/500}$ (W/m$^2$) in all regions in a transmission path between a transmitting portion and a receiving portion; and the oscillation wavelength of the laser is so controlled as to be outside the ranges for a central value of each wavelength with a width of ±0.06 nm determined as follows: for a transmission distance of optical space communication between 200 m inclusive and 400 m, a seventh absorption spectral series comprising 813.60 nm, 815.07 nm, 815.20 nm, 815.71 nm, 816.03 nm, 816.38 nm, 816.45 nm, 816.67 nm, 817.22 nm, 817.93 nm, 818.41 nm, 818.87 nm, 819.16 nm, 819.55 nm, 820.00 nm, 822.63 nm, 822.93 nm, 823.06 nm, 823.35 nm, 823.61 nm, 824.58 nm, 825.88 nm, 827.66 nm, 827.89 nm, 828.18 nm, 828.42 nm, 829.04 nm, 829.18 nm, 829.64 nm, 830.24 nm, 830.74 nm, 832.04 nm, 832.37 nm; for a transmission distance between 400 m inclusive and 800 m, said seventh absorption spectral series and an eighth absorption spectral series comprising 811.59 nm, 813.73 nm, 814.30 nm, 814.43 nm, 814.62 nm, 815.49 nm, 817.09 nm, 820.29 nm, 820.46 nm, 822.05 nm, 823.22 nm, 830.67 nm, 831.44 nm, 831.84 nm, 833.21 nm, 834.15 nm, 835.15 nm, 835.93 nm, 836.43 nm; for a transmission distance of at least 800 m, said seventh and eighth absorption spectral series and a ninth absorption spectral series comprising 813.28 nm, 813.89 nm, 814.85 nm, 814.94 nm, 815.61 nm, 818.06 nm, 818.16 nm, 821.46 nm, 822.37 nm, 823.97 nm, 824.24 nm, 825.52 nm, 826.21 nm, 826.57 nm, 827.46 nm, 835.59 nm, 836.97 nm.

8. An optical space communication method for communication with a laser as a radiative source and with a light signal therefrom propagating in the atmosphere, comprising a step of performing communication under the following conditions:

the laser oscillates with an oscillation wavelength L in a range of between 891 nm inclusive and 930 nm in a single longitudinal mode or in a mode approximate thereto;

an output power of said laser is controlled such that an irradiance of said laser does not exceed $6.47 \cdot 10^{(L-700)/500}$ (W/m$^2$) in all regions in a transmission path between a transmitting portion and a receiving portion; and the oscillation wavelength of the laser is so controlled as to be outside the ranges for a central value of each wavelength with a width of ±0.06 nm determined as follows: for a transmission distance of optical space communication between 200 m inclusive and 400 m, a tenth absorption spectral series comprising 895.67 nm, 895.75 nm, 896.52 nm, 896.60 nm, 896.79 nm, 897.41 nm, 898.31 nm, 898.93 nm, 899.01 nm, 899.31 nm, 899.44 nm, 900.29 nm, 900.65 nm, 901.00 nm, 901.43 nm, 901.94 nm, 902.53 nm, 902.84 nm, 907.19 nm, 907.47 nm, 907.70 nm, 908.22 nm, 908.33 nm, 908.98 nm, 910.25 nm, 910.81 nm, 912.05 nm, 913.22 nm, 913.90 nm, 915.55 nm, 915.84 nm, 917.66 nm, 917.74 nm, 917.94 nm, 919.82 nm, 921.99 nm, 928.13 nm, 928.75 nm, 929.59 nm, 929.80 nm, 930.05 nm; for a transmission distance between 400 m inclusive and 800 m, said tenth absorption spectral series and an eleventh absorption spectral series comprising 893.66 nm, 894.47 nm, 894.53 nm, 895.13 nm, 895.46 nm, 896.91 nm, 897.72 nm, 899.16 nm, 903.20 nm, 904.54 nm, 905.56 nm, 910.97 nm, 913.14 nm, 917.05 nm, 918.72 nm, 919.49 nm, 921.74 nm, 922.48 nm, 922.75 nm, 923.75 nm, 924.95 nm, 925.36 nm, 928.26 nm, 928.92 nm, 929.34 nm; for a transmission distance of at least 800 m, said tenth and eleventh absorption spectral series and a twelfth absorption spectral series comprising 891.36 nm, 893.12 nm, 896.09 nm, 899.24 nm, 906.31 nm, 906.55 nm, 906.63 nm, 907.26 nm, 907.34 nm, 909.49 nm, 909.61 nm, 909.77 nm, 913.50 nm, 913.70 nm, 915.27 nm, 921.53 nm, 924.78 nm, 926.31 nm, 927.59 nm, 929.25 nm.

9. An optical space communication method for communication with a laser as a radiative source and with a light signal therefrom propagating in the atmosphere, comprising a step of performing communication under the following conditions:

the laser oscillates with an oscillation wavelength L in a range of between 715 nm inclusive and 735 nm in a single longitudinal mode or in a mode approximate thereto;

an output power of said laser is controlled such that an irradiance of said laser does not exceed $11.5 \cdot 10^{(L-700)/500}$ (W/m$^2$) in all regions in a transmission path between a transmitting portion and a receiving portion; and the oscillation wavelength of the laser is so controlled as to be outside the ranges for a central value of each wavelength with a width of ±0.06 nm determined as follows: for a transmission distance of optical space communication between 200 m inclusive and 400 m, a first abortion spectral series comprising 716.94 nm, 718.36 nm, 718.66 nm, 718.83 nm, 718.93 nm, 719.36 nm, 719.55 nm, 720.25 nm, 720.33 nm, 720.63 nm, 720.86 nm, 723.67 nm, 724.28 nm, 724.58 nm, 725.44 nm, 726.76 nm, 727.56 nm, 727.94 nm, 729.24 nm, 730.66 nm; for a transmission distance between 400 m inclusive and 800 m, said first absorption spectral series and a second absorption spectral series comprising 715.99 nm, 716.49 nm, 716.54 nm, 722.56 nm, 722.94 nm, 723.49 nm, 724.78 nm, 724.94 nm, 725.57 nm, 726.66 nm, 727.71 nm, 728.91 nm, 730.53 nm, 732.08; for a transmission distance of at least 800 m, said first and second absorption spectral series and a third absorption spectral series comprising 716.27 nm, 719.70 nm, 720.05 nm, 721.16 nm, 721.86 nm, 725.09 nm, 725.21 nm, 726.00 nm, 727.20 nm, 728.99 nm, 729.71 nm, 730.19 nm, 731.15 nm, 731.45 nm, 731.76 nm, 732.93 nm, 733.29 nm, 733.58 nm.

10. An optical space communication method for communication with a laser as a radiative source and with a light signal therefrom propagating in the atmosphere, comprising a step of performing communication under the following conditions:

the laser oscillates with an oscillation wavelength L in a range of between 759 nm inclusive and 770 nm in a single longitudinal mode or in a mode approximate thereto;

an output power of said laser is controlled such that an irradiance of said laser does not exceed $11.5 \cdot 10^{(L-700)/500}$ (W/m$^2$) in all regions in a transmission path between a transmitting portion and a receiving portion; and the oscillation wavelength of the laser is so controlled as to be outside the ranges for a central value of each wavelength with a width of ±0.06 nm determined as follows: for a transmission distance of optical space communication between 200 m inclusive and 400 m, a fourth absorption spectral series comprising 759.61 nm, 759.66 nm, 759.73 nm, 759.84 nm, 759.97 nm, 760.03 nm, 760.08 nm, 760.28 nm, 760.39 nm, 760.44 nm, 760.57 nm, 760.66 nm, 760.78 nm, 760.89 nm, 761.00 nm, 761.14 nm, 761.25 nm, 761.34 nm, 761.42 nm, 761.53 nm, 761.73 nm, 761.84 nm, 762.32 nm, 762.54 nm, 762.66 nm, 762.91 nm, 763.05 nm, 763.32 nm, 763.44 nm, 763.72 nm, 766.86 nm, 764.17 nm, 764.28 nm, 764.62 nm, 764.73 nm, 765.10 nm, 765.21 nm, 765.61 nm, 765.72 nm, 766.15 nm, 766.26 nm, 766.71 nm, 766.80 nm, 767.28 nm, 767.39 nm, 767.88 nm, 767.97; for a transmission distance between 400 m inclusive and 800 m, said fourth absorption spectral series and a fifth absorption spectral series comprising 768.47 nm and 768.59 nm; for a transmission distance of at least 800 m, the fourth and fifth absorption spectral series and a sixth absorption spectral series comprising 769.13 nm and 769.22 nm.

11. An optical space communication method for communication with a laser as a radiative source and with a light signal therefrom propagating in the atmosphere, comprising a step of performing communication under the following conditions:

the laser oscillates with an oscillation wavelength L in a range of between 811 nm inclusive and 838 nm in a single longitudinal mode or in a mode approximate thereto;

an output power of said laser is controlled such that an irradiance of said laser does not exceed $11.5 \cdot 10^{(L-700)/500}$ (W/m$^2$) in all region in a transmission path between a transmitting portion and a receiving portion; and the oscillation wavelength of the laser is so controlled as to be outside the ranges for a central value of each wavelength with a width of ±0.06 nm determined as follows: for a transmission distance of optical space communication between 200 m inclusive and 400 m, a seventh absorption spectral series comprising 813.60 nm, 815.07 nm, 815.20 nm, 815.71 nm, 816.03 nm, 816.38 nm, 816.45 nm, 816.67 nm, 817.22 nm, 817.93 nm, 818.41 nm, 818.87 nm, 819.16 nm, 819.55 nm, 820.00 nm, 822.63 nm, 822.93 nm, 823.06 nm, 823.35 nm, 823.61 nm, 824.58 nm, 825.88 nm, 827.66 nm, 827.89 nm, 828.18 nm, 828.42 nm, 829.04 nm, 829.18 nm, 829.64 nm, 830.24 nm, 830.74 nm, 832.04 nm, 832.37 nm; for a transmission distance between 400 m inclusive and 800 m, said seventh absorption spectral series and an eighth absorption spectral series comprising 811.59 nm, 813.73 nm, 814.30 nm, 814.43 nm, 814.62 nm, 815.49 nm, 817.09 nm, 820.29 nm, 820.46 nm, 822.05 nm, 823.22 nm, 830.67 nm, 831.44 nm, 831.84 nm, 833.21 nm, 834.15 nm, 835.15 nm, 835.93 nm, 836.43 nm; for a transmission distance of at least 800 m, said seventh and eight absorption spectral series and a ninth absorption spectral series comprising 813.28 nm, 813.89 nm, 814.85 nm, 814.94 nm, 815.61 nm, 818.06 nm, 818.16 nm, 821.46 nm, 822.37 nm, 823.97 nm, 824.24 nm, 825.52 nm, 826.21 nm, 826.57 nm, 827.46 nm, 835.59 nm, 836.97 nm.

12. An optical space communication method for communication with a laser as a radiative source and with a light signal therefrom propagating in the atmosphere, comprising a step of performing communication under the following conditions:

the laser oscillates with an oscillation wavelength L in a range of between 891 nm inclusive and 930 nm in a single longitudinal mode or in a mode approximate thereto;

an output power of said laser is controlled such that an irradiance of said laser does not exceed $11.5 \cdot 10^{(L-700)/300}$ (W/m$^2$) in all regions in a transmission path between a transmitting portion and receiving portion; and the oscillation wavelength of the laser is so controlled as to be outside the ranges for a central value of each wavelength with a width of ±0.06 nm determined as follows: for a transmission distance of optical space communication between 200 m inclusive and 400 m, a tenth absorption spectral series comprising 895.67 nm, 895.75 nm, 896.52 nm, 896.60 nm, 896.79 nm, 897.41 nm, 898.31 nm, 898.93 nm, 899.01 nm, 899.31 nm, 899.44 nm, 900.29 nm, 900.65 nm, 901.00 nm, 901.43 nm, 901.94 nm, 902.53 nm, 902.84 nm, 907.19 nm, 907.47 nm, 907.70 nm, 908.22 nm, 908.33 nm, 908.98 nm, 910.25 nm, 910.81 nm, 912.05 nm, 913.22 nm, 913.90 nm, 915.55 nm, 915.84 nm, 917.66 nm, 917.74 nm, 917.94 nm, 919.82 nm, 921.99 nm, 928.13 nm, 928.75 nm, 929.59 nm, 929.80 nm, 930.05 nm; for a transmission distance between 400 m inclusive and 800 m, said tenth absorption spectral series and an eleventh absorption spectral series comprising 893.66 nm, 894.47 nm, 894.53 nm, 895.13 nm, 895.46 nm, 896.91 nm, 897.72 nm, 899.16 nm, 903.20 nm, 904.54 nm, 905.56 nm, 910.97 nm, 913.14 nm, 917.05 nm, 918.72 nm, 919.49 nm, 921.74 nm, 922.48 nm, 922.75 nm, 923.75 nm, 924.95 nm, 925.36 nm, 928.26 nm, 928.92 nm, 929.34 nm; for a transmission distance of at least 800 m, said tenth and eleventh absorption spectral series and a twelfth absorption spectral series comprising 891.36 nm, 893.12 nm, 896.09 nm, 899.24 nm, 906.31 nm, 906.55 nm, 606.63 nm, 907.26 nm, 907.34 nm, 909.49 nm, 909.61 nm, 909.77 nm, 913.50 nm, 913.70 nm, 915.27 nm, 921.53 nm, 924.78 nm, 926.31 nm, 927.59 nm, 929.25 nm.

13. An optical space communication method comprising the steps of:

providing a laser as a radiative source;

operating the laser to propagate a light signal therefrom in an atmosphere; and performing communication between remote locations under the following conditions: the laser having an oscillation wavelength L in one of a wavelength range between 967 nm and 1110 nm inclusive, and in a wavelength range between 1165 nm and 1315 nm inclusive wherein in a case where a transmission distance of optical space communication is between 100 m and 200 m inclusive, the laser has an oscillation wavelength L in a wavelength range between 967 nm and 1110 nm inclusive or in a wavelength range between 1165 nm and 1315 nm inclusive, whereas in a case where the transmission distance is at least 200 m, the laser has an oscillation wavelength L in a wavelength range between 986 nm and 1090 nm inclusive or in a wavelength range of between 1225 nm and 1295 nm inclusive.

14. An optical space communication method for communication with a laser as a radiative source and with a light signal therefrom propagating in an atmosphere, comprising a step of performing communication under the following conditions:

the laser oscillates with an oscillation wavelength L in a range between 715 nm and 735 nm in a single longitudinal mode or in a mode approximate thereto;

the oscillation wavelength of the laser is so controlled as to be outside ranges for a central value of each wavelength with a width of ±0.06 nm determined as follows:

a first absorption spectral series comprising 716.94 nm, 718.36 nm, 718.66 nm, 718.83 nm, 718.93 nm, 719.36 nm, 719.55 nm, 720.25 nm, 720.33 nm, 720.63 nm, 720.86 nm, 723.67 nm, 724.28 nm, 724.58 nm, 725.44 nm, 726.76 nm, 727.56 nm, 727.94 nm, 729.24, 730.66 nm.

15. An optical space communication method for communication with a laser as a radiative source and with a light signal therefrom propagating in an atmosphere, comprising a step of performing communication under the following conditions:

the laser oscillates with an oscillation wavelength L in a range between 715 nm and 735 nm in a single longitudinal mode or in a mode approximate thereto; and the oscillation wavelength of the laser is so controlled as to be outside ranges for a central value of each wavelength with a width of ±0.06 nm determined as follows: for a transmission distance of optical space communication between 200 m and 400 m inclusive, a first absorption spectral series comprising 716.94 nm, 718.36 nm, 718.66 nm, 718.83 nm, 718.93 nm, 719.36 nm, 719.55 nm, 720.25 nm, 720.33 nm, 720.63 nm, 720.86 nm, 723.67 nm, 724.28 nm, 724.58 nm, 725.44 nm, 726.76 nm, 727.56 nm, 727.94 nm, 729.24, 730.66 nm; for a transmission distance between 400 m and 800 m inclusive, the first absorption spectral series and a second absorption spectral series comprising 715.99 nm, 716.49 nm, 716.54 nm, 722.56 nm, 722.94 nm, 723.49 nm, 724.78 nm, 724.94 nm, 725.57 nm, 726.66, 727.71 nm, 728.91 nm, 730.53 nm, 732.08 nm; for a transmission distance of at least 800 m, the first and second absorption spectral series and a third absorption spectral series comprising 716.27 nm, 719.70 nm, 720.05 nm, 721.16 nm, 721.86 nm, 725.09 nm, 725.21 nm, 726.00 nm, 727.20 nm, 728.99 nm, 729.71 nm, 730.19 nm, 731.15 nm, 731.45 nm, 731.76 nm, 732.93 nm, 733.29 nm, 733.58 nm.

16. An optical space communication method for communication with a laser as a radiative source and with a light signal therefrom propagating in an atmosphere, comprising a step of performing communication under the following conditions:

the laser oscillates with an oscillation wavelength L in a range between 759 nm and 770 nm inclusive in a single longitudinal mode or in a mode approximate thereto; and the oscillation wavelength of the laser is so controlled as to be outside ranges of a central value of each wavelength with a width of ±0.06 nm determined as follows:
a fourth absorption spectral series comprising 759.61 nm, 759.66 nm, 759.73 nm, 759.84 nm, 759.97 nm, 760.03 nm, 760.08 nm, 760.28 nm, 760.39 nm, 760.44 nm, 760.57 nm, 760.66 nm, 760.78 nm, 760.89 nm, 761.00 nm, 761.14 nm, 761.25 nm, 761.34 nm, 761.42 nm, 761.53 nm, 761.73 nm, 761.84 nm, 762.32 nm, 762.54 nm, 762.66 nm, 762.91 nm, 763.05 nm, 763.32 nm, 763.44 nm, 763.72 nm, 763.86 nm, 764.17 nm, 764.28 nm, 764.62 nm, 764.73 nm, 765.10 nm, 765.21 nm, 765.61 nm, 765.72 nm, 766.15 nm, 766.26 nm, 766.71 nm, 766.80 nm, 767.28 nm, 767.39 nm, 767.88 nm, 767.97 nm.

17. An optical space communication method for communication with a laser as a radiative source and with a light signal therefrom propagating in an atmosphere, comprising a step of performing communication under the following conditions:

the laser oscillates with an oscillation wavelength L in a range between 759 nm inclusive and 770 nm in a single longitudinal mode or in a mode approximate thereto; and the oscillation wavelength of the laser is so controlled as to be outside ranges of a central value of each wavelength with a width of ±0.06 nm determined as follows: for a transmission distance of optical space communication between 200 m inclusive and 400 m, a fourth absorption spectral series comprising 759.61 nm, 759.66 nm, 759.73 nm, 759.84 nm, 759.97 nm, 760.03 nm, 760.08 nm, 760.28 nm, 760.39 nm, 760.44 nm, 760.57 nm, 760.66 nm, 760.78 nm, 760.89 nm, 761.00 nm, 761.14 nm, 761.25 nm, 761.34 nm, 761.42 nm, 761.53 nm, 761.73 nm, 761.84 nm, 762.32 nm, 762.54 nm, 762.66 nm, 762.91 nm, 763.05 nm, 763.32 nm, 763.44 nm, 763.72 nm, 763.86 nm, 764.17 nm, 764.28 nm, 764.62 nm, 764.73 nm, 765.10 nm, 765.21 nm, 765.61 nm, 765.72 nm, 766.15 nm, 766.26 nm, 766.71 nm, 766.80 nm, 767.28 nm, 767.39 nm, 767.88 nm, 767.97 nm; for a transmission distance between 400 m and 800 m inclusive, the fourth absorption spectral series and a fifth absorption spectral series comprising 768.47 nm and 768.59 nm; for a transmission distance of at least 800 m, the fourth and fifth absorption spectral series and a sixth absorption spectral series comprising 769.13 nm and 769.22 nm.

18. An optical space communication method for communication with a laser as a radiative source and with a light signal therefrom propagating in an atmosphere, comprising a step of performing communication under the following conditions:

the laser oscillates with an oscillation wavelength L in a range of between 811 nm and 838 nm inclusive in a single longitudinal mode or in a mode approximate thereto; and the oscillation wavelength of the laser is so controlled as to be outside ranges for a central value of each wavelength with a width of ±0.06 nm determined as follows:
a seventh absorption spectral series comprising 813.60 nm, 815.07 nm, 815.20 nm, 815.71 nm, 816.03 nm, 816.38 nm, 816.45 nm, 816.67 nm, 817.22 nm, 817.93 nm, 818.41 nm, 818.87 nm, 819.16 nm, 819.55 nm, 820.00 nm, 822.63 nm, 822.93 nm, 823.06 nm, 823.35 nm, 823.61 nm, 824.58 nm, 825.88 nm, 827.66 nm, 827.89 nm, 828.18 nm, 828.42 nm, 829.04 nm, 829.18 nm, 829.64 nm, 830.24 nm, 830.74 nm, 832.04 nm, 832.37 nm.

19. An optical space communication method for communication with a laser as a radiative source and with a light signal therefrom propagating in an atmosphere, comprising a step of performing communication under the following conditions:

the laser oscillates with an oscillation wavelength L in a range of between 811 nm and 838 nm inclusive in a single longitudinal mode or in a mode approximate thereto; and the oscillation wavelength of the laser is so controlled as to be outside ranges for a central value of each wavelength with a width of ±0.06 nm determined as follows: for a transmission distance of optical space communication between 200 m inclusive and 400 m, a seventh absorption spectral series comprising 813.60 nm, 815.07 nm, 815.20 nm, 815.71 nm, 816.03 nm, 816.38 nm, 816.45 nm, 816.67 nm, 817.22 nm, 817.93 nm, 818.41 nm, 818.87 nm, 819.16 nm, 819.55 nm, 820.00 nm, 822.63 nm, 822.93 nm, 823.06 nm, 823.35 nm, 823.61 nm, 824.58 nm, 825.88 nm, 827.66 nm, 827.89 nm, 828.18 nm, 828.42 nm, 829.04 nm, 829.18 nm, 829.64 nm, 830.24 nm, 830.74 nm, 832.04 nm, 832.37 nm; for a transmission distance between 400 m inclusive and 800 m, the seventh absorption spectral series and an eighth absorption spectral series comprising 811.59 nm, 813.73 nm, 814.30 nm, 814.43 nm, 814.62 nm, 815.49 nm, 817.09 nm, 820.29 nm, 820.46 nm, 822.05 nm, 823.22 nm, 830.67 nm, 831.44 nm, 831.84 nm, 833.21 nm, 834.15 nm, 835.15 nm, 835.93 nm, 836.43 nm; for a transmission distance of at least 800 m, the seventh and eighth absorption spectral series and a ninth absorption spectral series comprising 813.28 nm, 813.89 nm, 814.85 nm, 814.94 nm, 815.61 nm, 818.06 nm, 818.16 nm, 821.46 nm, 822.37 nm, 823.97 nm, 824.24 nm, 825.52 nm, 826.21 nm, 826.57 nm, 827.46 nm, 835.59 nm, 836.97 nm.

20. An optical space communication method for communication with a laser as a radiative source and with a light signal therefrom propagating in an atmosphere, comprising a step of performing communication under the following conditions:

the laser oscillates with an oscillation wavelength L in a range between 891 nm and 930 nm inclusive in a single longitudinal mode or in a mode approximate thereto; and the oscillation wavelength of the laser is so controlled as to be outside ranges for a central value of each wavelength with a width of ±0.06 nm determined as follows: a tenth absorption spectral series comprising 895.67 nm, 895.75 nm, 896.52 nm, 896.60 nm, 896.79 nm, 897.41 nm, 898.31 nm, 898.93 nm, 899.01 nm, 899.31 nm, 899.44 nm, 900.29 nm, 900.65 nm, 901.00 nm, 901.43 nm, 901.94 nm, 902.53 nm, 902.84 nm, 907.19 nm, 907.47 nm, 907.70 nm, 908.22 nm, 908.33 nm, 908.98 nm, 910.25 nm, 910.81 nm, 912.05 nm, 913.22 nm, 913.90 nm, 915.55 nm, 915.84 nm, 917.66 nm, 917.74 nm, 917.94 nm, 919.82 nm, 921.99 nm, 928.13 nm, 928.75 nm, 929.59 nm, 929.80 nm, 930.05 nm.

21. An optical space communication method for communication with a laser as a radiative source and with a light signal therefrom propagating in an atmosphere, comprising a step of performing communication under the following conditions:

the laser oscillates with an oscillation wavelength L in a range between 891 nm and 930 nm inclusive in a single longitudinal mode or in a mode approximate thereto; and the oscillation wavelength of the laser is so controlled as to be outside ranges for a central value of each wavelength with a width of ±0.06 nm determined as follows: for a transmission distance of optical space communication between 200 m inclusive and 400 m, a tenth absorption spectral series comprising 895.67 nm, 895.75 nm, 896.52 nm, 896.60 nm, 896.79 nm, 897.41 nm, 898.31 nm, 898.93 nm, 899.01 nm, 899.31 nm, 899.44 nm, 900.29 nm, 900.65 nm, 901.00 nm, 901.43 nm, 901.94 nm, 902.53 nm, 902.84 nm, 907.19, 907.47 nm, 907.70 nm, 908.22 nm, 908.33 nm, 908.98 nm, 910.25 nm, 910.81 nm, 912.05 nm, 913.22 nm, 913.90 nm, 915.55 nm, 915.84 nm, 917.66 nm, 917.74 nm, 917.94 nm, 919.82 nm, 921.99 nm, 928.13 nm, 928.75 nm, 929.59 nm, 929.80 nm, 930.05 nm; for a transmission distance between 400 m inclusive and 800 m, the tenth absorption spectral series and an eleventh absorption spectral series comprising 893.66 nm, 894.47 nm, 894.53 nm, 895.13 nm, 895.46 nm, 896.91 nm, 897.72 nm, 899.16 nm, 903.20 nm, 904.54 nm, 905.56 nm, 910.97 nm, 913.14 nm, 917.05 nm, 918.72 nm, 919.49 nm, 921.74 nm, 922.48 nm, 922.75 nm, 923.75 nm, 924.95 nm, 925.36 nm, 928.26 nm, 928.92 nm, 929.34 nm; for a transmission distance of at least 800 m, the tenth and eleventh absorption spectral series and a twelfth absorption spectral series comprising 891.36 nm, 893.12 nm, 896.09 nm, 899.24 nm, 906.31 nm, 906.55 nm, 906.63 nm, 907.26 nm, 907.34 nm, 909.49 nm, 909.61 nm, 909.77 nm, 913.50 nm, 913.70 nm, 915.27 nm, 921.53 nm, 924.78 nm, 926.31 nm, 927.59 nm, 929.25 nm.

* * * * *

UNITED STATES PATENT AND TRADEMARK OFFICE
CERTIFICATE OF CORRECTION

PATENT NO. : 5,680,241  Page 1 of 3
DATED : October 21, 1997
INVENTOR(S) : Sakanaka et al.

It is certified that error appears in the above-identified patent and that said Letters Patent is hereby corrected as shown below:

Item [57] ABSTRACT:

Line 8, "run" should read --nm--; and
    Line 12, (run)" should read --(nm)--.

COLUMN 1:

Line 56, "actuality" should read --actuality,--.

COLUMN 4:

Line 61, "W/m$^2$)"should read --(W/m$^2$)--.

COLUMN 13:

Line 50, "beam" should read --beams--.

COLUMN 25:

Line 44, "another" should read --other--.

COLUMN 26:

Line 15, "radioactive" should read --radiative--; and
    Line 59, "h" should read --L--.

UNITED STATES PATENT AND TRADEMARK OFFICE
CERTIFICATE OF CORRECTION

PATENT NO.  : 5,680,241             Page 2 of 3
DATED       : October 21, 1997
INVENTOR(S) : Sakanaka et al.

It is certified that error appears in the above-identified patent and that said Letters Patent is hereby corrected as shown below:

COLUMN 27:

Line 55, "-0.06" should read --±0.06--; and
Line 66, "765 10 nm, 765 21" should read --765.10 nm, 765.21--.

COLUMN 30:

Line 29, "767.97;" should read --767.97 nm--.

COLUMN 31:

Line 50, "606.63 nm," should read --906.63 nm,--. and
Line 64, "inclusive" should read --inclusive,--.

COLUMN 32:

Line 25, "729.24," should read --729.24 nm,--;
Line 44, "729.24," should read --729.24 nm,--; and
Line 49, "726.66," should read --726.66 nm,--.

UNITED STATES PATENT AND TRADEMARK OFFICE
CERTIFICATE OF CORRECTION

PATENT NO. : 5,680,241
DATED : October 21, 1997
INVENTOR(S) : Sakanaka et al.

It is certified that error appears in the above-identified patent and that said Letters Patent is hereby corrected as shown below:

<u>COLUMN 33</u>:

Line 8, "761.42," should read --761.42 nm,--.

<u>COLUMN 35</u>:

Line 10, "907.19," should read --907.19 nm,--.

Signed and Sealed this

Fourteenth Day of July, 1998

Attest:

BRUCE LEHMAN

*Attesting Officer*    *Commissioner of Patents and Trademarks*